(12) United States Patent
Fox et al.

(10) Patent No.: US 10,526,071 B2
(45) Date of Patent: Jan. 7, 2020

(54) HYDRAULIC SYSTEMS AND METHODS TO CONTROL A MEMBER

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 15/952,898

(22) Filed: Apr. 13, 2018

(65) Prior Publication Data

US 2019/0315457 A1 Oct. 17, 2019

(51) Int. Cl.
*F15B 11/17* (2006.01)
*B64C 13/40* (2006.01)
(Continued)

(52) U.S. Cl.
CPC ............ *B64C 13/40* (2013.01); *F03G 3/08* (2013.01); *F15B 11/17* (2013.01); *F15B 13/02* (2013.01); *F15B 2211/20576* (2013.01)

(58) Field of Classification Search
CPC ............ B64C 13/40; F15B 11/17; F15B 2211/20576; F03G 3/08
See application file for complete search history.

(56) References Cited

U.S. PATENT DOCUMENTS

| 2,660,028 | A | * | 11/1953 | Geyer | ............ | F15B 13/10 |
| | | | | | | 60/709 |
| 2,679,827 | A | * | 6/1954 | Perdue | ............ | F01B 17/00 |
| | | | | | | 92/8 |

(Continued)

FOREIGN PATENT DOCUMENTS

| DE | 102007029358 A1 | 1/2009 |
| EP | 1500825 A2 | 1/2005 |

(Continued)

OTHER PUBLICATIONS

Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.

(Continued)

*Primary Examiner* — Thomas E Lazo
(74) *Attorney, Agent, or Firm* — Coats & Bennett, PLLC

(57) ABSTRACT

The hydraulic system can include a control member that is operatively coupled to a member. The control member can include a hydraulic control member and an integrated inerter. Hydraulic fluid at variable pressures is moved through the hydraulic system by pumps. The hydraulic system can be configured for hydraulic fluid returning from the control member to the first pump to be delivered to the second pump prior to reaching the first pump. A dual-spool valve is positioned between the pumps and the control member to control the flow of the hydraulic fluid. The dual-spool valve is movable to move the hydraulic fluid at variable pressures into and out of first and second chambers of the control member. The dual spool valve can also be configured to operate the control member when a spool is not operational.

33 Claims, 36 Drawing Sheets

(51) Int. Cl.
*F03G 3/08* (2006.01)
*F15B 13/02* (2006.01)

(56) References Cited

U.S. PATENT DOCUMENTS

| | | | | |
|---|---|---|---|---|
| 3,253,613 | A * | 5/1966 | Richolt | B64C 13/24 137/596 |
| 3,585,902 | A * | 6/1971 | Anderson | B64C 13/00 91/363 A |
| 4,932,311 | A * | 6/1990 | Mibu | F15B 15/264 188/161 |
| 5,074,495 | A | 12/1991 | Raymond | |
| 5,144,851 | A * | 9/1992 | Grimm | B64O 13/36 74/89.26 |
| 5,937,646 | A | 8/1999 | Zakula | |
| 6,352,018 | B1 * | 3/2002 | Krisher | B60T 8/326 92/130 R |
| 6,578,425 | B2 * | 6/2003 | Hickman | B64O 13/40 73/716 |
| 7,059,563 | B2 * | 6/2006 | Huynh | B64O 9/16 244/226 |
| 8,109,163 | B2 * | 2/2012 | Hudson | B64C 25/24 74/89.25 |
| 8,359,851 | B2 * | 1/2013 | Haase | F15B 15/149 60/406 |
| 8,418,956 | B2 * | 4/2013 | Fukui | B64C 13/42 244/99.6 |
| 8,499,552 | B2 | 8/2013 | Kauss et al. | |
| 9,334,914 | B2 * | 5/2016 | Gartner | F16F 7/1022 |
| 9,618,102 | B2 * | 4/2017 | Hirai | F16H 25/205 |
| 9,709,052 | B1 | 7/2017 | Tanju et al. | |
| 9,823,670 | B2 | 11/2017 | Wilson et al. | |
| 9,969,233 | B2 * | 5/2018 | Leglize | B60G 15/12 |
| 9,994,304 | B2 * | 6/2018 | Ito | B64O 9/323 |
| 10,384,764 | B2 * | 8/2019 | Blanc | B64O 13/40 |
| 2007/0194738 | A1 * | 8/2007 | Hirai | B64O 13/42 318/480 |
| 2015/0059325 | A1 | 3/2015 | Knussman et al. | |
| 2015/0114151 | A1 * | 4/2015 | Hirai | F16H 25/205 74/89.25 |
| 2016/0091004 | A1 | 3/2016 | Gomm et al. | |
| 2016/0096617 | A1 * | 4/2016 | Ito | B64O 9/323 92/51 |
| 2017/0233064 | A1 | 8/2017 | McCormick et al. | |
| 2017/0335916 | A1 | 11/2017 | Fox | |
| 2018/0135717 | A1 | 5/2018 | Fox et al. | |
| 2018/0156293 | A1 | 6/2018 | Fox et al. | |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

Avago Technologies, "Optical Mouse Sensors," AV00-0115EN, May 14, 2007, pp. 1-24.
European Search Report dated Sep. 6, 2019 in re EP application No. 19169010.6 filed Apr. 12, 2019.
European Search Report dated Sep. 3, 2019 in re EP application No. 19167685.7 filed Apr. 5, 2019.

* cited by examiner

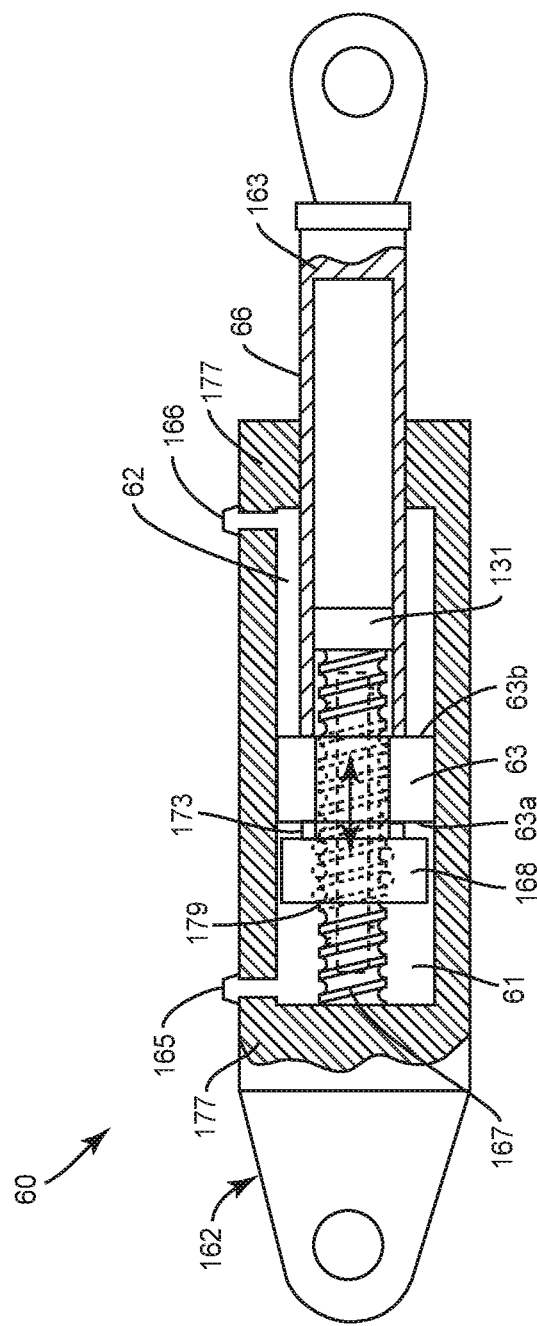
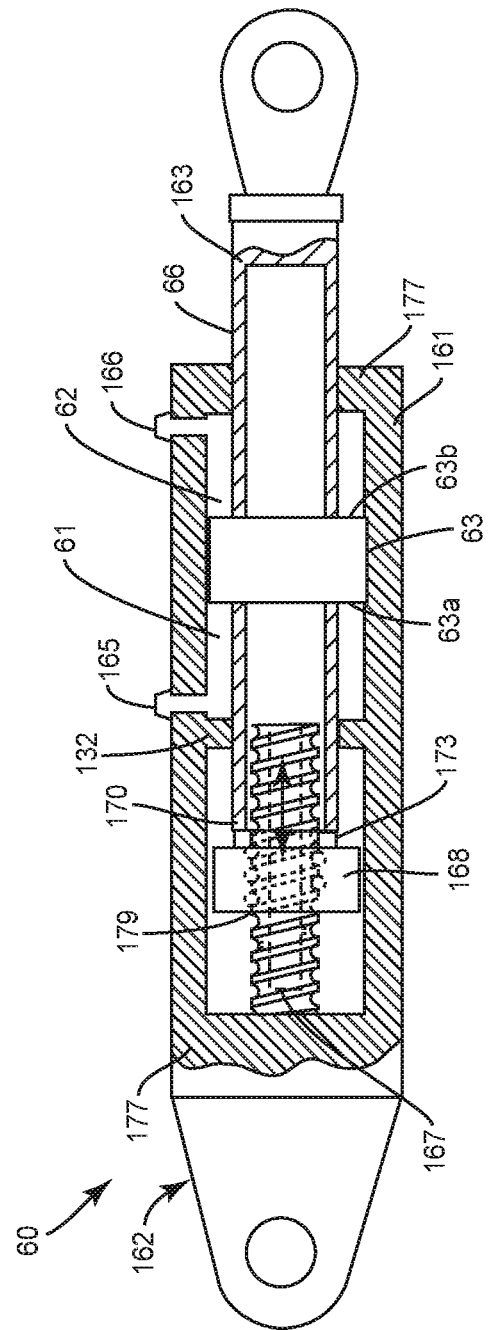

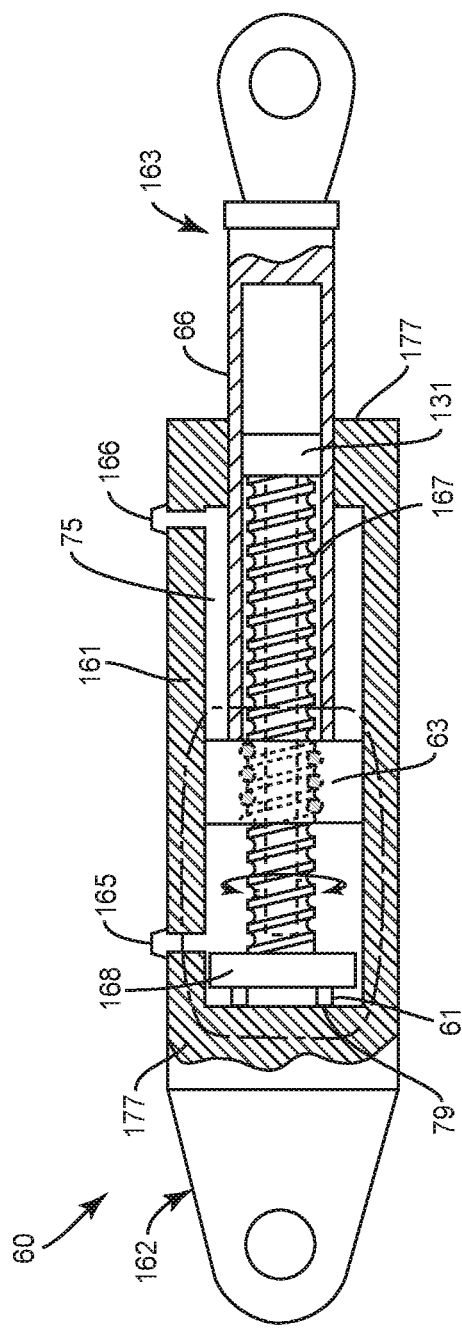
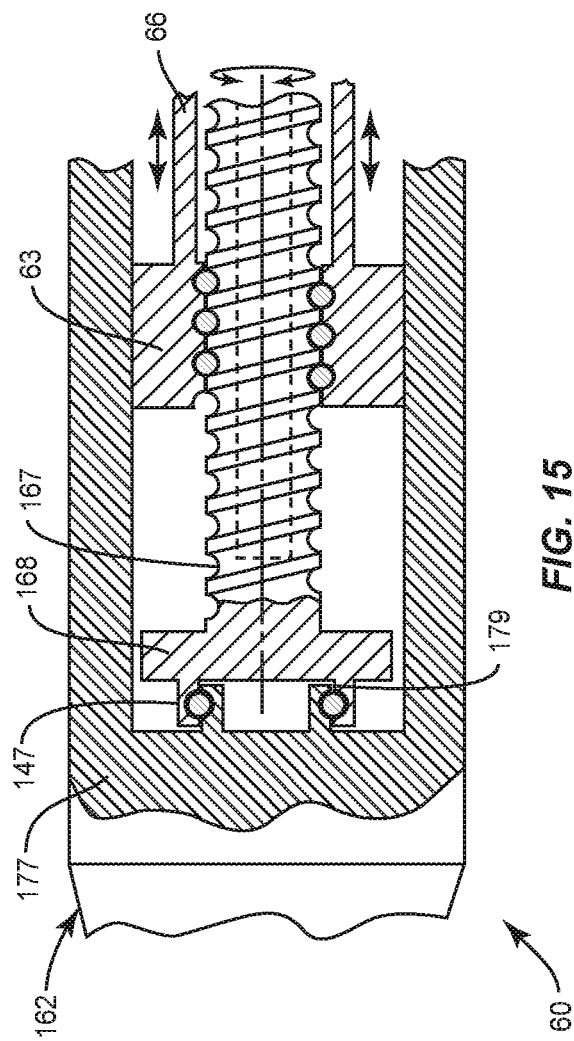
FIG. 14
FIG. 15

US 10,526,071 B2

HYDRAULIC SYSTEMS AND METHODS TO CONTROL A MEMBER

BACKGROUND

Hydraulic systems provide hydraulic fluid to hydraulic control devices to move and position members. The hydraulic systems can include a series of supply and return lines. One or more control devices are positioned along the supply and return lines and are attached to the members. A pump moves the hydraulic fluid through the supply and to the control devices. The hydraulic fluid from the control device is moved into the return line which returns the hydraulic fluid to the pump to be reused in the hydraulic system.

The members can have exterior forces exerted upon them during use. These exterior forces can cause unwanted movement of the members, which can include flutter. Flutter can be described as unstable aerodynamically-induced oscillations of the member. Unless damped, the oscillations can rapidly increase in amplitude with the potential for undesirable results, including exceeding the strength capability of the member and the control member. Contributing to the potential for flutter is elasticity in the hydraulic system. For example, hydraulic control devices can exhibit a linear spring response under load due to compressibility of the hydraulic fluid. The compressibility of the hydraulic fluid can be characterized by the cross-sectional area of the control device piston, the volume of the hydraulic fluid, and the effective bulk modulus of elasticity of the hydraulic fluid.

Methods of addressing flutter involve limiting the inertia of the load on the control device and/or increasing the size of the piston in the control device as a means to react the inertia load. Unfortunately, these methods result in a larger overall hydraulic system and/or larger control devices and/or are required to operate at higher hydraulic flow. The larger overall hydraulic system can include a larger physical size and/or increased weight.

SUMMARY

One aspect is directed to a system to control a member. The system includes a control device with a hydraulic actuator and integrated inerter that is operatively coupled to the member. A first pump delivers hydraulic fluid at a first pressure to the control device. A second pump delivers hydraulic fluid to the control device at a second pressure that is higher than the first pressure. A dual spool valve is positioned between the control device and the first and second pumps and directs the hydraulic fluid to the control device. A return line extends between the control device and the first pump to deliver the hydraulic fluid from the control device to one of the first pump and the second pump.

In one aspect, the return line also includes a spare line that extends between the return line and the second pump to deliver the hydraulic fluid that is returning towards the first pump to the second pump prior to reaching the first pump.

In one aspect, a valve is positioned upstream from the second pump and movable between a first valve position in which the hydraulic fluid is delivered to the second pump from the first pump and not the spare line and a second valve position in which the hydraulic fluid is delivered to the second pump from the spare line.

In one aspect, the inerter includes: a first terminal and a second terminal movable relative to one another along an axis and to be coupled to a support structure and the member; a housing; a piston axially slidable within the housing; a rod coupled to the piston and movable with the first terminal; a threaded shaft coupled to and movable with the second terminal; a flywheel having a flywheel annulus coupled to at least one of the rod and the threaded shaft with the flywheel configured to rotate in proportion to axial acceleration of the rod relative to the threaded shaft in correspondence with actuation of the member by the control device.

In one aspect, the piston divides an interior of the housing between a first chamber and a second chamber with the dual spool valve directs the hydraulic fluid into and out of the first chamber and the second chamber.

In one aspect, the dual spool valve includes: a first port to receive hydraulic fluid from one of the first and second pumps; a second port to discharge hydraulic fluid to the return line; first and second valve sections each including a manifold, a first line fluidly connected to the first port, a second line fluidly connected to the second port, and a third line fluidly connected to the control device and with the manifold of the first valve section being spaced away from the manifold of the second valve section; a first spool positioned in the first manifold and a second spool positioned in the second manifold with each of the first and second spools movable to prevent the flow of hydraulic fluid when aligned with one of the first and second lines; with each of the first and second spools independently positionable within the respective first and second manifolds between a first position aligned with just one of the first and second lines, and a second position aligned with just the other of the first and second lines, and with the first and second spools spaced away from the third lines in each of the first and second positions to allow hydraulic fluid to flow into and out of the control device.

In one aspect, each of the first and second spools includes a first block and a second block that are spaced apart along a shaft and with the first blocks aligned with one of the first and second lines in the first position and with the second blocks aligned with the other of the first and second lines in the second position and with both the first and second blocks positioned away from the third lines in each of the first and second positions.

In one aspect, each of the first and second valve sections is a 3-way valve.

In one aspect, the dual spool valve includes: a first port to receive hydraulic fluid from the second pump; a second port to discharge hydraulic fluid to the return line; and a third port to receive hydraulic fluid from the first pump. The dual spool valve also includes a first valve section that includes: a first manifold with a supply port, a return port, and an actuator port; a first closure line that extends between the third port and the control device; and a first spool movable within the first manifold between a first position to allow hydraulic fluid to flow through the first valve section to and from the control device through just the supply port, a second position to allow hydraulic fluid to flow through the first valve section to and from the control device through just the return port, and a third position to allow hydraulic fluid to flow through the first valve section to and from the control device through just the first closure line. The dual spool valve also includes a second valve section that includes: a second manifold with a supply port, a return port, and an actuator port; a second closure line that extends between the third port and the control device; and a second spool movable within the second manifold between a first position to allow hydraulic fluid to flow through the second valve section to and from the control device through just the supply port, a second position to allow hydraulic fluid to flow through the second valve section to and from the control device through just the return port, and a third position to allow hydraulic fluid to flow through the second valve section to and from the control device through just the second closure line.

In one aspect, the first spool includes a shaft with first and second blocks spaced apart along the shaft with the shaft extending across the first closure line in each of the first and second positions.

In one aspect, the shaft includes an orifice that aligns with the first closure line in the third position to allow hydraulic fluid to flow along the first closure line and through the orifice to and from the control device.

One aspect is directed to a system to move a member. The system includes a first pump that delivers hydraulic fluid at a first pressure and a second pump that delivers hydraulic fluid at a second pressure. A control device includes an integrated hydraulic actuator and an inerter with the actuator including a first chamber and a second chamber and the control device operatively coupled to the member. A dual spool valve is positioned between the first and second pumps and the control device to direct the hydraulic fluid to and from the first and second chambers. Supply lines deliver the hydraulic fluid from the first and second pumps to the dual spool valve. Return lines deliver the hydraulic fluid from the dual spool valve to the first pump and the second pump.

In one aspect, the return line includes a spare line that extends between the return line and the second pump to deliver the hydraulic fluid that is returning towards the first pump to the second pump prior to reaching the first pump.

In one aspect, a valve is positioned upstream from the second pump and movable between a first valve position in which the hydraulic fluid is delivered to the second pump from the first pump and a second valve position in which the hydraulic fluid is delivered to the second pump from the spare line.

In one aspect, the inerter includes: a first terminal and a second terminal movable relative to one another along an axis and to be coupled to a support structure and the member; a housing; a piston axially slidable within the housing; a rod coupled to piston and movable with the first terminal; a threaded shaft coupled to and movable with the second terminal; a flywheel having a flywheel annulus coupled to at least one of the rod and the threaded shaft with the flywheel configured to rotate in proportion to axial acceleration of the rod relative to the threaded shaft in correspondence with actuation of the member by the control device.

In one aspect, the piston divides an interior of the housing between a first chamber and a second chamber and the dual spool valve directs the hydraulic fluid into and out of the first chamber and the second chamber.

In one aspect, the dual spool valve comprises: a first port to receive hydraulic fluid from one of the first and second pumps; a second port to discharge hydraulic fluid to the return line; first and second valve sections each including a manifold, a first line fluidly connected to the first port, a second line fluidly connected to the second port, and a third line fluidly connected to the control device and with the manifold of the first valve section being spaced away from the manifold of the second valve section; a first spool positioned in the first manifold and a second spool positioned in the second manifold with each of the first and second spools movable to prevent the flow of hydraulic fluid when aligned with one of the first and second lines; each of the first and second spools independently positionable within the respective first and second manifolds between a first position aligned with just one of the first and second lines, and a second position aligned with just the other of the first and second lines, and with the first and second spools spaced away from the third lines in each of the first and second positions to allow hydraulic fluid to flow into and out of the control device.

In one aspect, each of the first and second valve sections is a 3-way valve.

In one aspect, the dual spool valve includes: a first port to receive hydraulic fluid from the second pump; a second port to discharge hydraulic fluid to the return line; a third port to receive hydraulic fluid from the first pump. The dual spool valve also includes a first valve section including: a first manifold with a supply port, a return port, and an actuator port; a first closure line that extends between the third port and the control device; and a first spool movable within the first manifold between a first position to allow hydraulic fluid to flow through the first valve section to and from the control device through just the supply port, a second position to allow hydraulic fluid to flow through the first valve section to and from the control device through just the return port, and a third position to allow hydraulic fluid to flow through the first valve section to and from the control device through just the first closure line. The dual spool valve also includes a second valve section including: a second manifold with a supply port, a return port, and an actuator port; a second closure line that extends between the third port and the control device; and a second spool movable within the second manifold between a first position to allow hydraulic fluid to flow through the second valve section to and from the control device through just the supply port, a second position to allow hydraulic fluid to flow through the second valve section to and from the control device through just the return port, and a third position to allow hydraulic fluid to flow through the second valve section to and from the control device through just the second closure line.

One aspect is directed to a system to control a member. The system includes a first pump that delivers hydraulic fluid at a first pressure. The system includes a control device with a hydraulic actuator and integrated inerter that is operatively coupled to the member. The system includes a supply line through which the hydraulic fluid is delivered from the first pump to the control device. The system includes a second pump that delivers the hydraulic fluid to the control device at a second pressure that is higher than the first pressure. The system includes a dual spool valve that is positioned between the control device and the first and second pumps with the dual spool valve to direct the hydraulic fluid. The system includes a return line that returns the hydraulic fluid from the control device to the first pump. The system includes a spare line that extends between the return line and the second pump with the spare line positioned along the return line upstream from the first pump. At least a portion of the hydraulic fluid that is supplied to the second pump comprises the hydraulic fluid that is returning along the return line from the control device towards the first pump.

In one aspect, a second line extends between the second pump and the dual spool valve to deliver the hydraulic fluid from the second pump to the control device with the second line being different than the supply line.

In one aspect, a valve is positioned upstream of the second pump and configured between a first valve position in which hydraulic fluid is delivered to the second pump from just the first pump and a second valve position in which the hydraulic fluid is delivered to the second pump from the spare line.

One aspect is directed to a method of operating a system to control a member. The method includes: positioning a dual spool valve at a first position and supplying hydraulic fluid at a first pressure from a first pump to a control device that is operatively connected to the member with the control device comprising an integrated actuator and inerter; returning the hydraulic fluid from the control device to the first pump along a return line; in response to a load pressure demand, positioning the dual spool valve at a second position and supplying hydraulic fluid to the control device from a second pump at an elevated pressure that is above the first pressure; and in response to the load pressure demand, supplying the hydraulic fluid to the second pump from the return line prior to the hydraulic fluid being returned to the first pump.

In one aspect, the method also includes supplying hydraulic fluid at a first pressure to both a first chamber and a second chamber of the control device.

In one aspect, the method also includes moving hydraulic fluid between the first and second chambers without the hydraulic fluid exiting from the control device.

In one aspect, the method also includes in response to the load pressure demand, supplying hydraulic fluid to the second pump from an accumulator positioned upstream from the second pump.

In one aspect, the method also includes in response to the load pressure demand, continuing to supply hydraulic fluid to the second pump from the first pump.

In one aspect, the method also includes supplying the second pump with hydraulic fluid that is supplied from just the first pump when the load pressure demand is below a predetermined amount and supplying the second pump with hydraulic fluid from just each of an accumulator and the return line in response to determining the load pressure demand is above the predetermined amount.

One aspect is directed to a method of controlling a control device to move a member. The method includes positioning a first spool in a first manifold at a second position and opening a supply port in the first manifold and moving hydraulic fluid from a supply line and into a first chamber of a hydraulic actuator and positioning a second spool in a second manifold at a first position and opening a return port in the second manifold and moving hydraulic fluid from a second chamber of the hydraulic actuator to a return line and moving a piston of the hydraulic actuator in a first direction. The method includes positioning the first spool in the first manifold at a first position and opening a return port in the first manifold and positioning the second spool in the second manifold at the first position and opening the return port in the second manifold and moving hydraulic fluid from the first chamber of the hydraulic actuator through the return port in the first manifold and through the return port in the second manifold and into the second chamber of the hydraulic actuator and moving the piston of the hydraulic actuator in a second direction. The method includes positioning the first spool in the first manifold at the first position and opening the return port in the first manifold and moving hydraulic fluid from the first chamber to the return line and positioning the second spool in the second manifold to a second position and opening a supply port in the second manifold and moving hydraulic fluid from the supply line and into the second chamber of the hydraulic actuator and moving the piston of the hydraulic actuator in the second direction. The method includes positioning the first spool in the first manifold at the first position and opening the return port in the first manifold and positioning the second spool in the second manifold to the first position and opening the return port in the second manifold and moving hydraulic fluid from the second chamber of the hydraulic actuator through the return port in the second manifold and through the return port in the first manifold and into the first chamber of the hydraulic actuator and moving the piston of the hydraulic actuator in the first direction. The method includes that while moving hydraulic fluid to the first and second chambers, axially accelerating using an inerter coupled to the control device a first terminal relative to a second terminal simultaneously with an in proportion to actuation of the control device. The method includes rotationally accelerating a flywheel in the control device in proportion to and simultaneous with the axial acceleration of the first terminal relative to the second terminal.

In one aspect, the method also includes moving hydraulic fluid through the first manifold when moving hydraulic fluid into and from the first chamber of the hydraulic actuator and moving hydraulic fluid through the second manifold when moving hydraulic fluid into and from the second chamber.

In one aspect, the method also includes positioning the first spool in the first manifold at the second position and blocking hydraulic fluid from moving through the return port of the first manifold.

In one aspect, the method also includes positioning the second spool in the second manifold at the first position and blocking hydraulic fluid from moving into the second chamber through the supply port of the second manifold.

In one aspect, the method also includes moving the first spool independently from the second spool.

BRIEF DESCRIPTION OF THE DRAWINGS

FIG. 10 is a side section view of a control member with a hydraulic actuator and an integrated inerter.

FIG. 11 is a side section view of a control member with a hydraulic actuator and an integrated inerter.

FIG. 14 is a side section view of a control member with a hydraulic actuator and an integrated inerter.

FIG. 15 is a partial section view of a portion of the control member of FIG. 14.

DETAILED DESCRIPTION

The present disclosure is directed to hydraulic systems and methods to control a member. The hydraulic system can include a control device that is operatively coupled to a controlled member. The control device includes a hydraulic actuator and an integrated inerter. Hydraulic fluid is moved through the hydraulic system by a first pump that delivers hydraulic fluid to the control device at a first pressure, and a second pump that delivers hydraulic fluid to the control device at a second pressure that is higher than the first pressure. The hydraulic system is configured such that the hydraulic fluid returning from the control device to the first pump can be delivered to the second pump prior to reaching the first pump. A dual-spool valve is positioned between the pumps and the control device to control the flow of the hydraulic fluid. The dual-spool valve is movable to move the hydraulic fluid at variable pressures into and out of first and second chambers of the control device. The dual spool valve can also be configured to operate the control device in the event a spool of the dual-spool valve is not operational.

Figure 1:
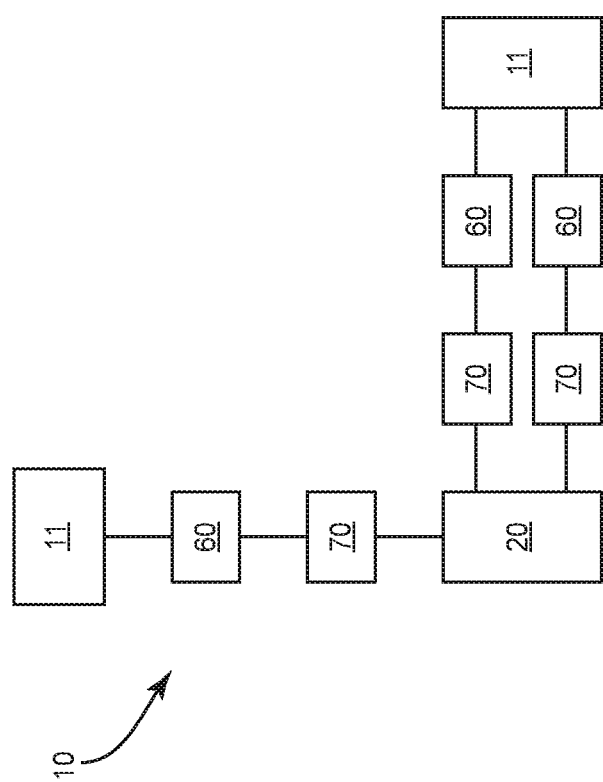
FIG. 1 is a hydraulic system to move a member.

FIG. 1 illustrates an overview of a system 10. The system 10 includes one or more control devices 60 connected to the members 11. The control devices 60 include a hydraulic actuator with first and second chambers and an integrated inerter. A hydraulic system 20 supplies hydraulic fluid to first and second chambers of the control devices 60 to adjust the orientation of the members 11. The hydraulic system 20 is configured to supply the hydraulic fluid at variable pressures. Dual-spool valves 70 are positioned to control the flow of hydraulic fluid into and out of the first and second chambers to position the control devices 60 and thus the members 11.

Figure 2:
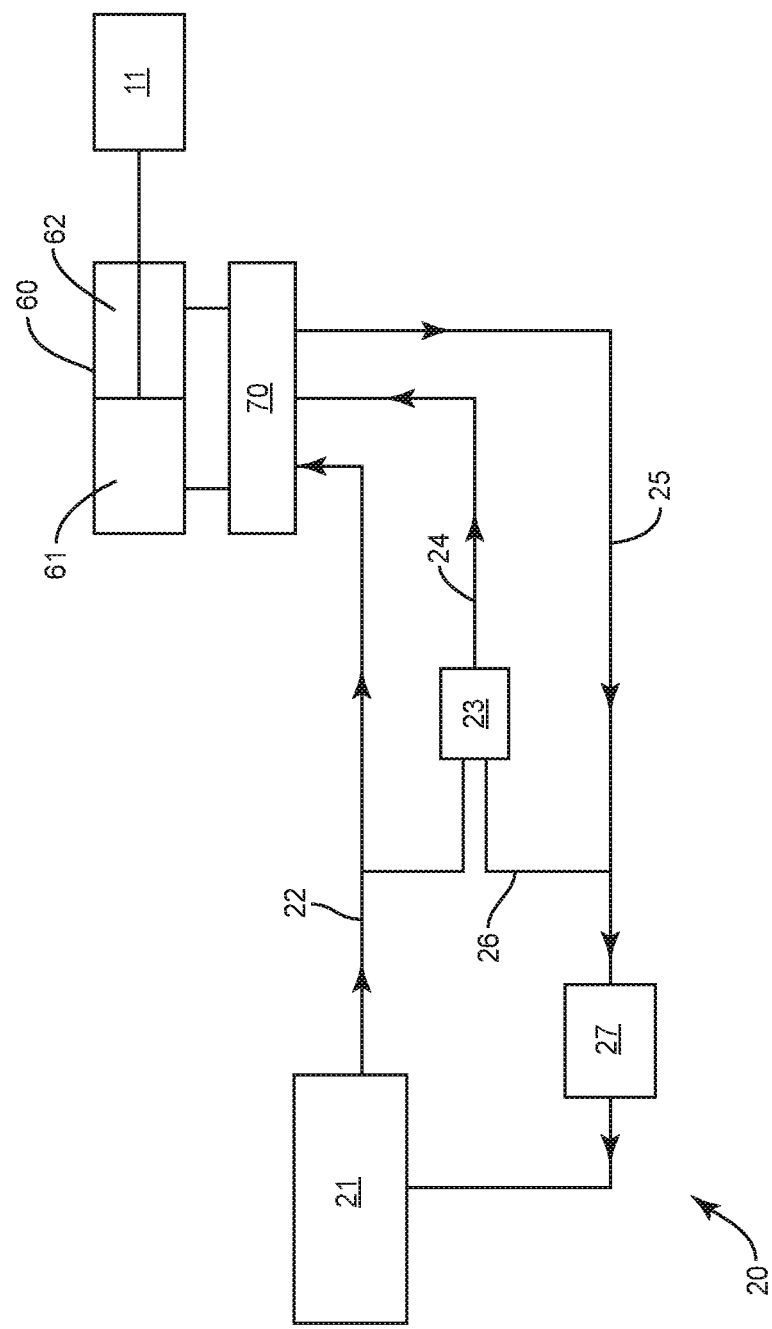
FIG. 2 is a schematic diagram of a hydraulic system that supplies hydraulic fluid to and from a control member.

FIG. 2 illustrates an overview of a hydraulic system 20 that supplies hydraulic fluid to the control devices 60. Although FIG. 2 includes a single control device 60, the hydraulic system 20 is capable of supplying hydraulic fluid to multiple control devices 60. The hydraulic system 20 includes a first pump 21 that supplies the hydraulic fluid at a supply pressure through a supply line 22 to the control device 60.

A second pump 23 can supply hydraulic fluid at an elevated pressure to the control device 60. The second pump 23 can be necessary to supply the hydraulic fluid when the hydraulic fluid supplied by the first pump 21 is below a predetermined pressure. The second pump 23 is able to supply hydraulic fluid at a variety of pressures. One hydraulic system 20 includes the first pump 21 supplying hydraulic fluid at 1200 psi and the second pump 23 supplying hydraulic fluid at a pressure of 8000 psi.

A second line 24 extends between the second pump 23 and the dual-spool valve 70 to supply the higher pressure hydraulic fluid. A return line 25 moves the hydraulic fluid from the control devices 60 and the valves 70. The return line 25 leads to a reservoir 27 where the hydraulic fluid can be stored and cooled before being re-supplied to the first pump 21. A spare line 26 extends from the return line 25 and leads to the second pump 23. In the event an inadequate amount of hydraulic fluid is available at the second pump 23, returning hydraulic fluid can be supplied to the second pump 23 before it is moved along the return line 25 to the reservoir 27.

The second pump 23 is positioned along the hydraulic system 20 away from the first pump 21. This distributed architecture can provide for more responsiveness as hydraulic fluid at an elevated pressure can be supplied to the control devices 60 in less time. The distributed architecture also allows for hydraulic fluid from the control devices 60 to bypass a portion of the return line 25 and be directed to the second pump 23. This feature saves energy loss due to a pressure drop in the return line 25 that routes the hydraulic fluid back to the first pump 21. The supply line 22 from the first pump 21 can also be reduced m size to save weight since at high flow rates the first pump 21 is not responsible for providing hydraulic fluid.

The reservoir 27 is positioned along the return line 25 upstream from the first pump 21. The reservoir 27 stores the hydraulic fluid at a working pressure and can also provide for cooling the hydraulic fluid prior to being re-introduced back to the first pump 21.

Figure 3:
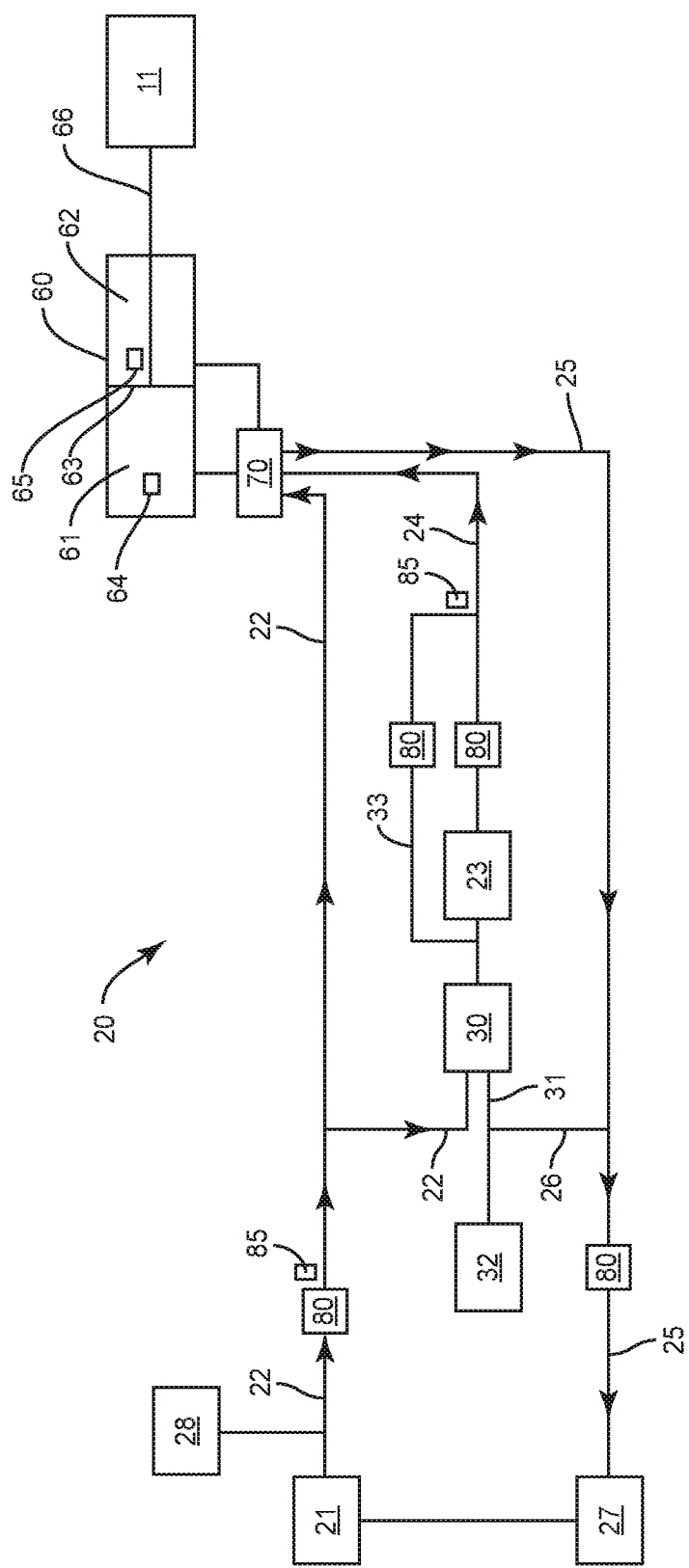
FIG. 3 is a schematic diagram of a hydraulic system that supplies hydraulic fluid to and from a control member.

FIG. 3 illustrates a more detailed view of the hydraulic system 20. The supply line 22 leads to the valve 70 to supply hydraulic fluid at a first pressure from the first pump 21. The supply line 22 also branches and leads to the second pump 23. One or more check valves 80 can be positioned along the supply line 22 to allow the hydraulic fluid to flow in the supply direction and prevent movement in the reverse direction (i.e., towards the first pump 21).

An accumulator 28 can be connected to the supply line 22 downstream from the first pump 21 to supply additional hydraulic fluid for use in the hydraulic system 20. The accumulator 28 can supply hydraulic fluid in certain circumstances, such as but not limited to when a volume of hydraulic fluid moving along the supply line 22 drops below a predetermined level or when a pressure of the hydraulic fluid in the supply line 22 is below a predetermined level.

Figure 4:
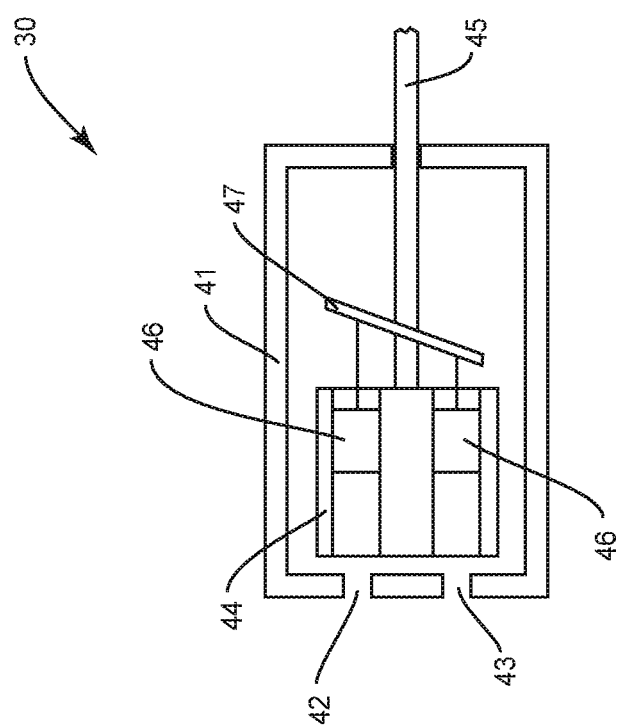
FIG. 4 is a schematic diagram of a hydraulic pump.

The second pump 23 is configured to move hydraulic fluid at an elevated pressure through a second line 24 to the valve 70. One type of hydraulic pump 21, 23 is an axial piston pump which can also be referred to as a swash-plate pump. FIG. 4 illustrates an axial piston pump 21, 23 that includes a housing 41 with an inlet 42 and an outlet 43. A block 44 is positioned within the housing 41 and rotates on a shaft 45. Pistons 46 are positioned within cylinders in the block 44 and are contact against a stationary swashplate 47. The swashplate 47 is positioned at an angle relative to the block 44. The pistons 46 extend outward from the block 44 and contact against the swashplate 47 during rotation of the block 44. The pistons 46 remain in contact with the swashplate 47 during the rotation resulting in a reciprocating motion that drives the hydraulic fluid through the outlet 43. The hydraulic pumps 21, 23 can also include other hydraulic pumps that can move pressurized fluid through the supply lines 22, 24.

Returning to FIG. 3, a valve 30 is positioned upstream from the second pump 23 to control the source of hydraulic fluid that is supplied to the second pump 23. The valve 30 can be a shuttle valve that is positionable between first and second valve positions based on the pressure of the hydraulic fluid at the valve 30. In the first valve position, the valve 30 passes hydraulic fluid from just the supply line 22 to the second pump 23. In the second valve position, the valve 30 passes hydraulic fluid from just the spare line 26 and an accumulator 32 to the second pump 23. The valve 30 can be a shuttle valve that is sprung from the first valve position to the second valve position to assure an adequate amount of hydraulic fluid is supplied to the second pump 23.

Figure 3A:
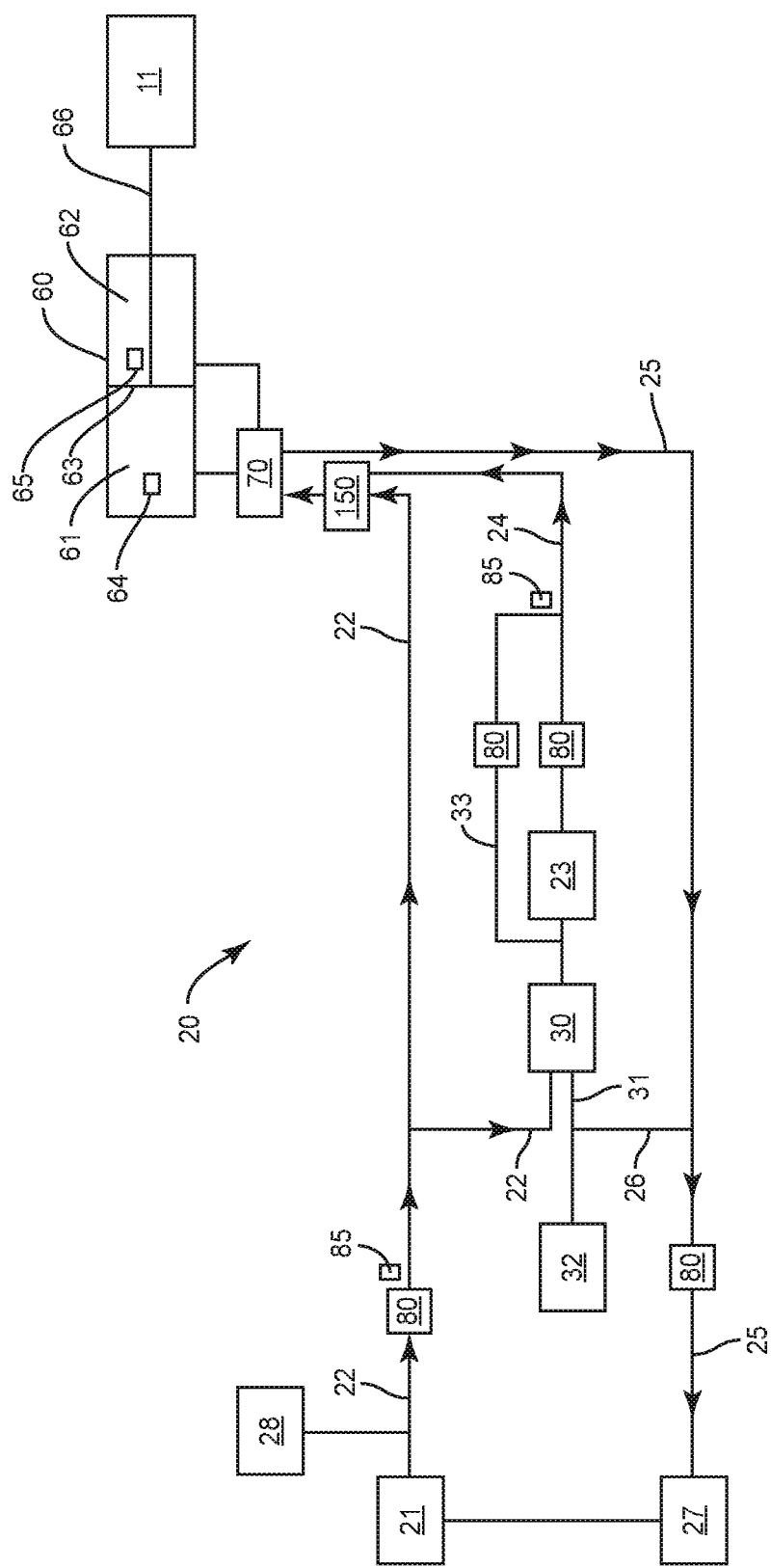
FIG. 3A is a schematic diagram of a hydraulic system that supplies hydraulic fluid to and from a control member and with a manifold.

In hydraulic system 20 as illustrated in FIG. 3A, the boost line 24 and the supply line 22 supplies hydraulic fluid to the valve 70. A manifold 150 can receive hydraulic fluid from both supply line 22 and boost line 24 and output a single supply line to the valve 70. The manifold 150 can be integrated with the valve 70 or can be positioned upstream from the valve 70. The manifold 150 can include check valves and/or shuttle valves. In one design, the check valves include different cracking pressures to avoid cross talk between the pumps 21, 23.

An accumulator 32 is positioned upstream from the second pump 23 and holds hydraulic fluid that can be supplied to the second pump 23 when the valve 30 is in the second valve position. The accumulator 32 assures the spare line 26 provides adequate flow of hydraulic fluid when the valve 30 is in the second valve position. The close proximity of the accumulator 32 to the second pump 23 provides for an efficient supply of hydraulic fluid as little pressure is lost while the hydraulic fluid moves from the accumulator 32 to the second pump 23.

A check valve 80 is positioned along the return line 25 downstream from the spare line 26 to protect against pulling fluid from this downstream section of the return line 25. This isolation adds robustness to the distributed hydraulic system 20 when it is attached to another hydraulic system, such as a central circuit that protects both circuits from unnecessary coupling. The check valve 80 assures that the hydraulic fluid in the return line 25 downstream from the spare line 26 does not move the wrong direction.

A bypass line 33 extends around the second pump 23. In the event of failure of the second pump 23, hydraulic fluid can be supplied to the second line 24 through the bypass line 33. Check valves 80 are positioned along both the bypass line 33 and the line immediately downstream from the second pump 23 to prevent the hydraulic fluid from flow in the wrong direction during periods of differing pressure differentials among the different sections of the hydraulic system 20.

The control device 60 includes first and second chambers 61, 62 that are separated by a piston 63. A rod 66 extends from the piston 63 and is attached to the member 11. Hydraulic fluid is introduced and removed from each of the first and second chambers 61, 62 to control the movement of the piston 63 and rod 66 and the connected member 11.

Sensors are positioned to detect the pressure of the hydraulic fluid at various locations around the hydraulic system 20. Sensor 64 is positioned in the first chamber 61 to sense the pressure of the hydraulic fluid. Likewise, sensor 65 is positioned to sense the pressure in the second chamber 62. A sensor 85 is positioned downstream from the second pump 23 to detect the pressure of the hydraulic fluid being fed into the second line 24. A sensor 85 can also be positioned along the supply line 22 to determine the pressure of the hydraulic fluid from the first pump 21. Various types of sensors 64, 65, 85 can be used, including but not limited to pressure transducers.

Figure 5:
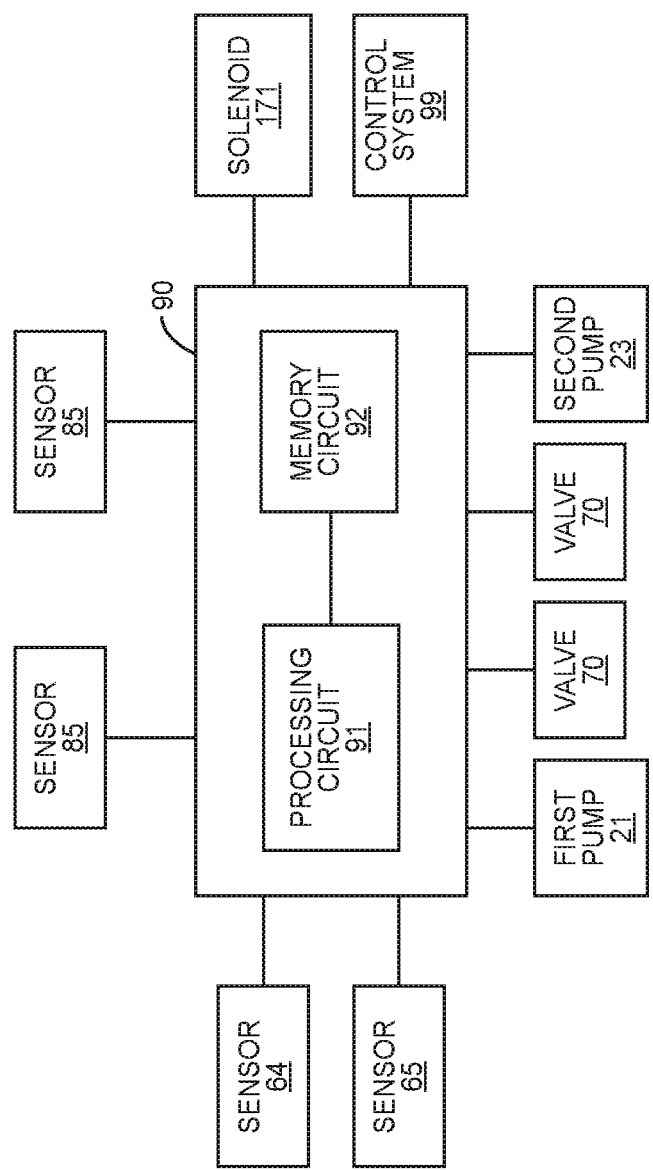
FIG. 5 is a schematic diagram of an actuation control unit.

An actuation control unit 90 can control the movement of hydraulic fluid through the hydraulic system 20. FIG. 5 illustrates an actuation control unit 90 that includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and can include various memory devices such as random access memory, read-only memory, and flash memory.

The actuation control unit 90 can receive signals from the sensors 64, 65, 85 positioned along the hydraulic system 20. The actuation control unit 90 can communicate with a control system 99 that controls one or more functions of an apparatus in which the member 11 is mounted. The control system 99 can control the assembly in which the hydraulic system is positioned. Examples include but are not limited to a flight control system of an aircraft, a vehicle control system for an automobile or truck, and a control system for a exoskeleton system. The control system 99 can provide various data to the actuation control unit 90, such as but not limited to the commanded movements of the member 11.

The actuation control unit 90 controls the movement of the hydraulic fluid through the hydraulic system 20 to position the member 11 in its commanded position. The actuation control unit 90 uses inputs from the sensors 64, 65, 85 to control one or more of the first pump 21, second pump 23 and valves 70 to supply the needed hydraulic fluid.

Figure 6:
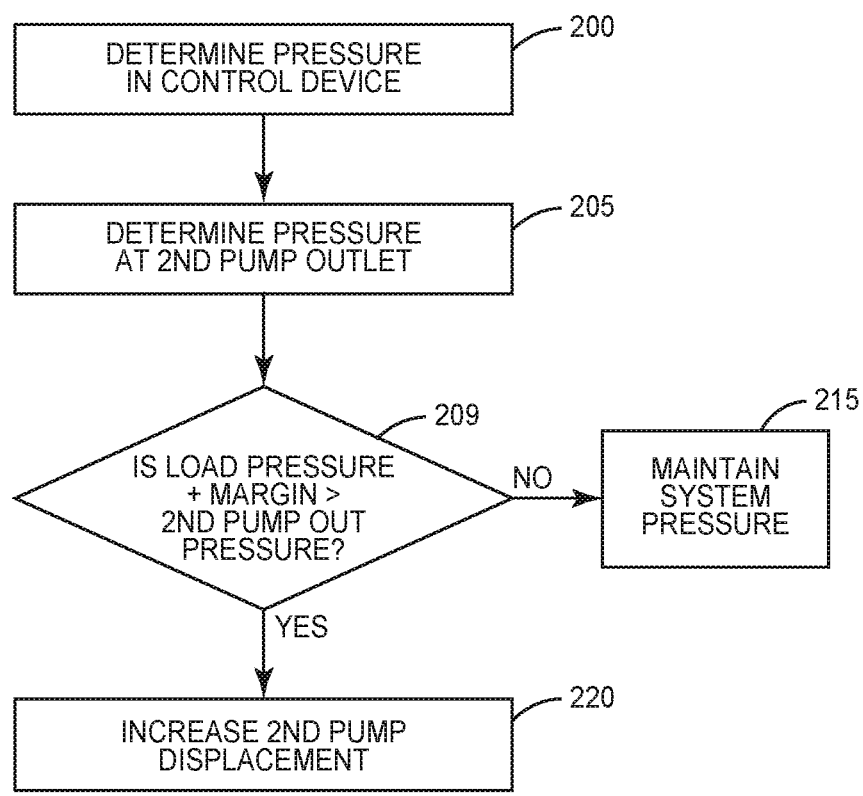
FIG. 6 is a flowchart diagram of a method of operating a hydraulic system.

FIG. 6 illustrates a method of controlling fluid supply through the hydraulic system 20. The hydraulic fluid in the hydraulic system 20 is initially supplied by the first pump 21 and the second pump 23 is controlled at zero displacement.

The actuation control unit 90 determines the load pressure of the hydraulic fluid in the control device 60 (block 200). This can include determining the pressure of the hydraulic fluid in one or both of the first and second chambers 61, 62. The actuation control unit 90 also determines the pressure of the hydraulic fluid at the outlet of the second pump 23 (block 205).

The actuation control unit 90 then determines whether the first pressure being supplied by the first pump 21 is adequate for the present needs of the control device 60. The actuation control unit 90 determines whether the load pressure at the control device 60 plus a margin is greater than the pressure of the hydraulic fluid at the second pump outlet (block 209). With the second pump 23 having zero displacement, the pressure of the hydraulic fluid at the second pump outlet is the first pressure.

When the load pressure at the control device 60 plus the margin is not greater than the pressure at the second pump outlet, the actuation control unit 90 continues to supply the hydraulic fluid at the first pressure that is supplied by the first pump 21 (block 215). The hydraulic fluid at the system pressure is adequate to accommodate the load that is being placed on the control device 60 through the member 11. The second pump 23 continues to be controlled at zero displacement.

When the load pressure and margin at the control device 60 is greater than the pressure at the second pump outlet, the actuation control unit 90 increases the second pump displacement (block 220). This increases the pressure of the hydraulic fluid supplied to the control device 60 to meet the load demand to move the member 11 to the commanded position. The actuation control unit 90 can increase the second pump 23 a predetermined amount once the need for additional pressure is determined. The actuation control unit 90 can also increase the second pump 23 output an amount dependent upon the extent of the need at the control device 60 dependent upon the load that is being placed on the control device 60.

As described above, a margin can be added to the load pressure before the output of the second pump 23 is increased. The size of the margin can vary.

The valve 30 upstream from the second pump 23 is in a first valve position when the system pressure is used for the control device 60. The first valve position provides for the hydraulic fluid to be supplied just through the supply line 22 from the first pump 21. The valve 30 is in a second valve position when the second pump 23 increases displacement above zero to supply elevated pressure to the control device 60. In the second valve position, hydraulic fluid is supplied to the second pump 23 from just the spare line 26 and the accumulator 32.

In another embodiment, when the valve 30 is in the second valve position, hydraulic fluid can also be supplied to the second pump 23 from the supply line 22 in addition to the accumulator 32 and the spare line 26.

The valve 30 is configured to move from the first valve position to the second valve position when the system pressure supplied by first pump 21 drops below a predetermined level. By using flow that would otherwise return to the first pump 21, energy is saved because the first pump 21 no longer has to bring that portion of the return flow which is bypassed to the spare line 26 to the first pump outlet pressure. This feature also saves energy loss due to pressure drop in the return line 25 that routes from back to the first pump 21. The supply line 22 from the first pump 21 can also be reduced in size to save weight since hydraulic fluid at elevated pressures are not moved through this section of the supply line 22.

The accumulator 32 is employed at the valve 30 to assure the spare line 26 provides adequate hydraulic fluid when the valve 30 is in the second valve position. The accumulator 32 provides hydraulic fluid to the second pump 23 in an efficient manner since it is very close to the second pump 23 and therefore loses little hydraulic pressure in the line to the second pump 23.

Figure 7:
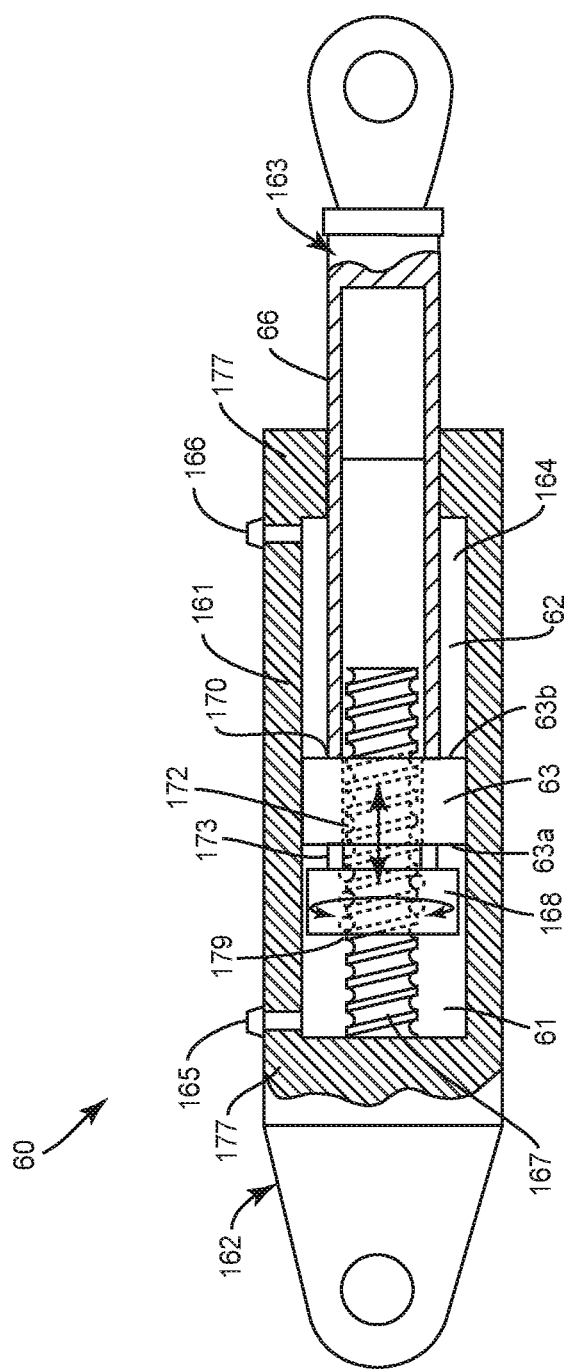
FIG. 7 is a side section view of a control member with a hydraulic actuator and an integrated inerter.

A variety of different control devices 60 can be used that include integrated hydraulic actuators and inerters. FIG. 7 includes a control device 60 that includes a first terminal 162 that includes a housing 161, and a second terminal 163 that includes the rod 66. The first and second terminals 162, 163 can be configured to be attached to different objects. One of the first and second terminals 162, 163 can be connected to the member 11, and the other terminal 162, 163 can be attached to a support. Each of the first and second terminals 162, 163 can include an opening that receives a fastener to provide for the connection.

The housing 161 extends around and encloses a chamber 164 that extends between end walls 177. The chamber 164 includes a port 165 towards a first end wall 77 and a port 166 towards a second end wall 177. The ports 165, 166 provide for the pressurized hydraulic fluid to enter and exit the chamber 164. A threaded shaft 167 extends outward from the first end wall 177 and into the chamber 164. A flywheel 168 is threaded onto the threaded shaft 167 and is movable by relative rotation along the length. The flywheel 168 rotates in proportion to an axial rate of the rod 66 that extends through an opening in the second end wall 177. The rod 66 includes an inner end 170 that is hollow and extends around the threaded shaft 167.

The piston 63 is mounted to the inner end 170 of the rod 66. The piston 63 includes an outer diameter that substantially matches the inner diameter of the chamber 164. A seal (not illustrated) such as an O-ring can extend around the outer perimeter of the piston 63 to seal against the wall of the chamber 164. The piston 63 is axially slidable within the chamber 164 and divides the chamber 164 into the first chamber 61 positioned between the piston 63 and the first end wall 177, and the second chamber 62 positioned between the piston 63 and the second end wall 177. The piston 63 includes a first face 63a and an opposing second face 63b. The piston 63 can provide for an unbalanced setting with one of the piston sides 63a, 63b having a greater cross-sectional area than the opposite piston side 63a, 63b. The piston 63 also includes an inner opening 172 that extends around the shaft 167.

The flywheel 168 is mounted in the first chamber 61 and is rotatably coupled to the piston 63 at a flywheel annulus 179. The flywheel 168 is configured to rotationally accelerate in proportion to axial acceleration of the piston 63 and piston rod 66 relative to the shaft 167. A bearing 173 can be positioned along the shaft 167 between the flywheel 168 and the piston 63.

Figure 8:
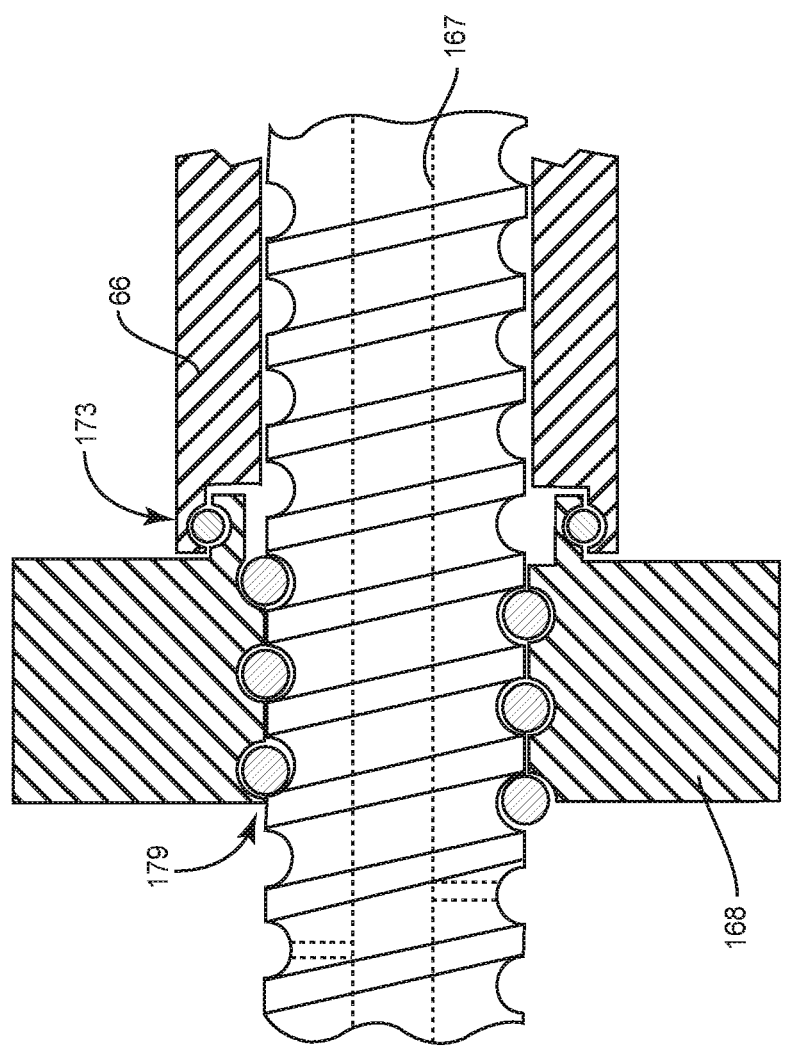
FIG. 8 is a partial section view of a portion of the control member of FIG. 7.

FIG. 8 illustrates a magnified sectional view of FIG. 7 illustrating the flywheel 168 coupled to the rod 66 at the flywheel annulus 179. The flywheel annulus 179 is also threadably engaged to the shaft 167. The shaft 167 can be configured as a ball screw with helical grooves for receiving ball bearings which couple similarly-configured helical grooves in the flywheel annulus 179 to the ball screw with minimal friction. Although not illustrated, the flywheel annulus 179 can include a ball nut for circulating the ball bearings coupling the flywheel 168 to the ball screw. In another example not shown, the threaded shaft 167 can include a lead screw with threads to which the flywheel annulus 179 is directly engaged. The flywheel 168 can be configured for engagement to any one of a variety of different types of configurations of threaded shafts, and is not limited to the ball screw.

FIG. 8 also illustrates a bearing 173 for coupling the flywheel annulus 179 to the rod 66 such that the rod 66 and flywheel 168 can translate in unison as the flywheel 168 rotates due to threadable engagement with the threaded shaft 167. Although the bearing 173 is shown as a bearing, the bearing 173 can be provided in any one a variety of different configurations capable of axially coupling the flywheel 168 to the rod 66 with a minimal amount of axial free play. For example, the bearing 173 can be configured as a roller bearing (not shown). In still further examples, the flywheel 168 can be coupled to the rod 66 without a bearing while still allowing the flywheel 168 to rotate during translation of the rod 66 and flywheel 168 relative to the threaded shaft 167.

Figure 9:
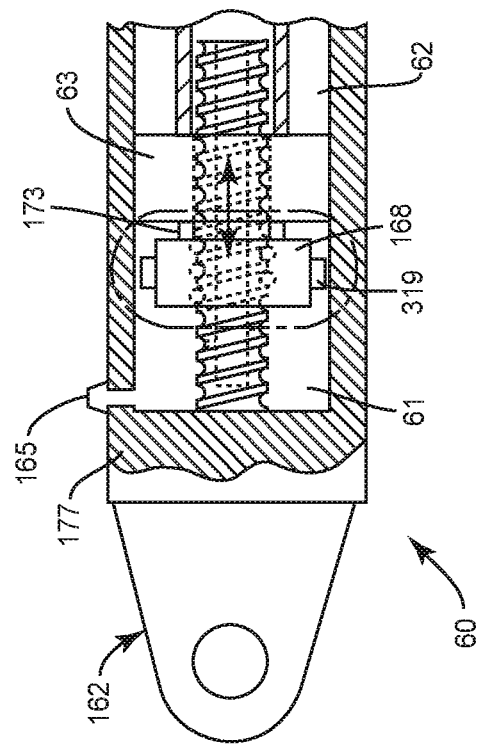
FIG. 9 is a partial section view of a control member.

FIG. 9 illustrates a control device 60 with an integrated inerter and actuator. The control device 60 includes protrusions 319 for generating viscous damping during rotation of the flywheel 168 when the flywheel 168 is immersed in the hydraulic fluid in the first chamber 61. The protrusions 319 generate or increase the viscous damping capability of the inerter during rotation of the flywheel 168, and thereby increase the damping capability of the inerter. The protrusions 319 extend radially outward and are circumferentially spaced around a perimeter of the flywheel 168. During rotation of the flywheel 168, the protrusions 319 generate viscous damping capability and add to the inerting capability of the inerter. The protrusions 319 can extend outward from various portions of the flywheel 168, including one or both of the opposing sides of the flywheel 168. The protrusions 319 can include various geometric sizes, shapes or configurations.

FIG. 10 illustrates another control device 60 that includes an inerter integrated into a non-balanced hydraulic actuator. The control device 60 includes an interior piston 131 coupled to a free end of the threaded shaft 167. The interior piston 131 can be axially slidable within the interior of the rod 66 such that the interior piston 131 is non-rotatable relative to the interior of the rod 66 during axial movement of the rod 66 relative to the threaded shaft 167. The perimeter of the interior piston 131 can be sealed (e.g., via an O-ring) to an interior wall of the rod 66. The inclusion of the interior piston 131 can reduce the total volume of hydraulic fluid required to fill the second chamber 62 during extension of the rod 66 relative to the increased volume of hydraulic fluid required to fill the first chamber 61.

FIG. 11 is another control device 60 that includes an inerter integrated into a hydraulic actuator. The control device 60 includes the hydraulic actuator configured as a balanced actuator having opposing faces 63a, 63b of the piston 63 with substantially equivalent cross-sectional areas. The housing 161 can include a separator wall 132 separating the portion of the housing 161 containing the flywheel 168 from the portion of the housing 161 containing the piston 63. The first chamber 61 is located on one of the sides of the piston 63 and a second chamber 62 is located on the opposite side of the piston 63. The piston 63 is mounted on the rod 66. One end of the rod 66 extends through the second end wall 177. The rod 66 extends through the separator wall 132 with the inner end 170 positioned on an opposing side. The flywheel 168 is rotatably coupled to the rod 66 in a manner as described above.

Figure 12:
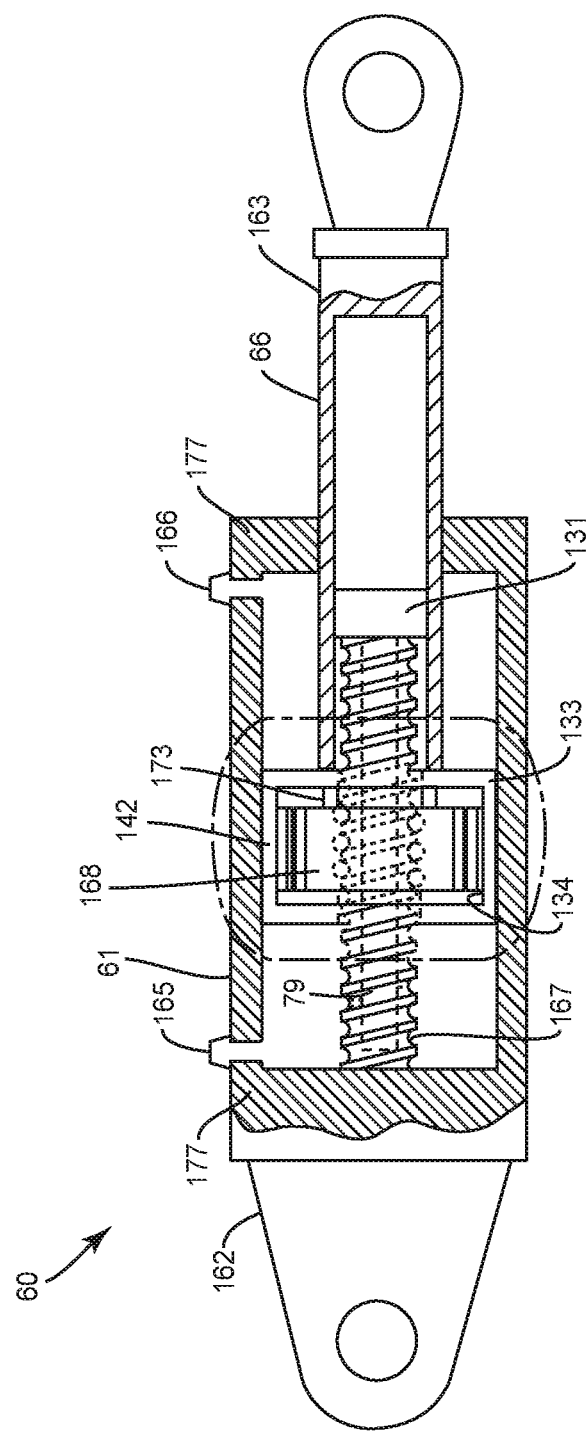
FIG. 12 is a side section view of a control member with a hydraulic actuator and an integrated inerter.
Figure 13:
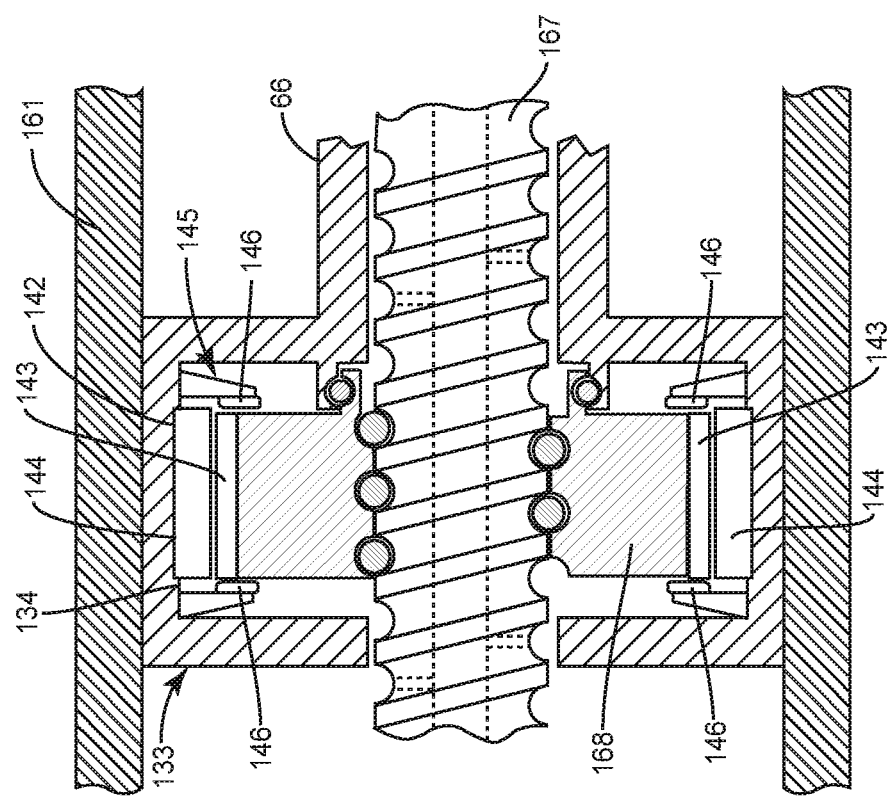
FIG. 13 is a partial section view of a portion of the control member of FIG. 12.

FIG. 12 includes a control device 60 with an inerter integrated with a hydraulic actuator. The inerter includes an electric flywheel motor 142 as illustrated in FIG. 13 to facilitate active control of rotation of the flywheel 168 rotation using electromotive force from the integrated flywheel motor 142. Active control can include using the flywheel motor 142 to apply a torque to the flywheel 168 to resist or aid the torque that is generated by the flywheel 168 due to axial acceleration of the first terminal 162 relative to the second terminal 163. The flywheel motor 142 can be configured to provide active damping and/or active braking of the hydraulic actuator and the load inertia.

As illustrated in FIG. 13, the flywheel 168 is rotatably coupled to and contained within a generally hollow piston 133 which is actually slidable within the actuator housing 161. The flywheel motor 142 is incorporated into the flywheel 168 and the piston 133 and configured to actively control rotation of the flywheel 168 in correspondence with relative axial movement of the rod and threaded shaft 167. The flywheel motor 142 can be operated in a manner to accelerate and/or decelerate the flywheel 168 by applying a torque to the flywheel 168 either in correspondence with (e.g., the same direction as) or in opposition to the direction of rotation of the flywheel 168. In this manner, the flywheel motor 142 can apply a torque to the flywheel 168 to resist or aid the flywheel torque generated due to axial acceleration of the first terminal 162 relative to the second terminal 163.

The flywheel motor 142 can be a permanent magnet direct-current (DC) motor having one or more permanent magnets 143 mounted to the flywheel 168. For example, a plurality of permanent magnets 143 can be circumferentially spaced around the flywheel perimeter. In addition, the flywheel motor 142 can include a plurality of windings 144 mounted to the piston 133. In one example, a plurality of windings 144 can be circumferentially spaced around the piston inner wall 134. In another example, a plurality of windings 144 can be circumferentially spaced around the side wall of the housing 161. In other examples, the flywheel motor 142 can be a brushless DC motor or some other motor configuration, and is not limited to a permanent magnet DC motor configuration. In an example not shown, a linear position sensor can be included to sense the linear position of the piston 133 and generate a signal representative of the linear piston position for commutating the flywheel motor 142 in correspondence with the piston position.

The flywheel motor 142 can be configured to assist or aid in rotating the flywheel 168 for a commanded direction of motion. For example, the flywheel motor 142 can provide a torque to accelerate the flywheel 168 at the start of motion of the control device 60 toward a commanded position. The torque applied to the flywheel 168 by the flywheel motor 142 can be approximately equal in magnitude to the torque required to rotationally accelerate the flywheel 168 due to axial acceleration of the threaded shaft 167 relative to the rod 66. By using the flywheel motor 142 to remove the torque required to rotationally accelerate the flywheel 168, the piston 133 can move more quickly to a commanded position than if the flywheel motor 142 did not accelerate the flywheel 168. In this manner, the flywheel motor 142 can allow faster responsiveness of the control device 60 than a conventional actuator.

In a further example of active control, the flywheel motor 142 can be operated in a manner to provide a torque to decelerate the flywheel 168 as the control device 60 approaches a commanded position. In this regard, the flywheel motor 142 can be operated as a brake to oppose the flywheel torque generated by the axial deceleration of the shaft 167 relative to the rod 66. Actively controlling rotation of the flywheel 168 in this manner can prevent or limit position overshoot of the control device 60 and thereby increase the stability of the control device 60. In such an arrangement, the actuator and inerter can be configured with a failure mode that ensures that without active motor control, the actuator is capable of exhibiting a desired damped response in a manner preventing underdamping of the control device 60.

Referring still to FIG. 13, in another example of active control, the flywheel motor 142 can include a brake 145 configured to provide dynamic braking of the flywheel 168.

In this regard, the brake 145 can be operated in a manner to decelerate the flywheel 168 or to increase existing deceleration of the flywheel 168. For examples that include a flywheel motor 142, the brake 145 can be operated in a manner to increase existing deceleration of the flywheel 168 caused by rotational drag of the flywheel motor 142. In addition, the flywheel motor 142 can be operated in a manner to oppose disturbances (e.g., undesirable motion) of the actuator.

The brake 145 can be configured as a disc brake having brake pads 146. The flywheel 168 can function as a brake rotor against which the brake pads 146 can be frictionally engaged during braking. In other examples not shown, a separate brake rotor can be provided which can be directly or indirectly coupled to the flywheel 168. In the example shown, a hydraulic brake cylinder (not shown) can be included to actuate the brake pads 146 into frictional engagement with one or both of the opposing axial faces (e.g., planar faces) of the flywheel 168 for decelerating the flywheel 168. The brake 145 can include at least two pairs of opposing brake pads 146 located on diametrically opposing sides of the brake rotor. Each pair of brake pads 146 can be held in position by a bracket. Although the brake 145 is described and illustrated as a disc brake, the inerter can incorporate one or more different types of brakes such as a drum brake or any other type of brake capable of decelerating the flywheel 168.

FIG. 14 illustrates another control device 60 with an inerter integrated into a hydraulic actuator. The flywheel 168 is rotatably coupled or attached to the first end wall 177 of the housing 161 of the first terminal 162. The piston 63 is attached to the rod 66 which extends from the piston 63 through the second end wall 177 of the housing 161. FIG. 15 is a magnified sectional view of FIG. 14 illustrating the flywheel annulus 179 rotatably coupled by a bearing 147 to the end wall 177. The shaft 167 is fixedly coupled to the flywheel 168 and is rotatable in unison with the flywheel 168. The piston 63 is fixedly coupled to the rod 66 and threadably engaged to the shaft 167 in a manner such that linear translation of the rod 66 relative to the shaft 167 causes rotation of the flywheel 168 and shaft 167 in unison. Axial movement of the shaft 167 relative to the rod 66 can be in correspondence with actuation of the hydraulic actuator of the control device 60.

Figure 16:
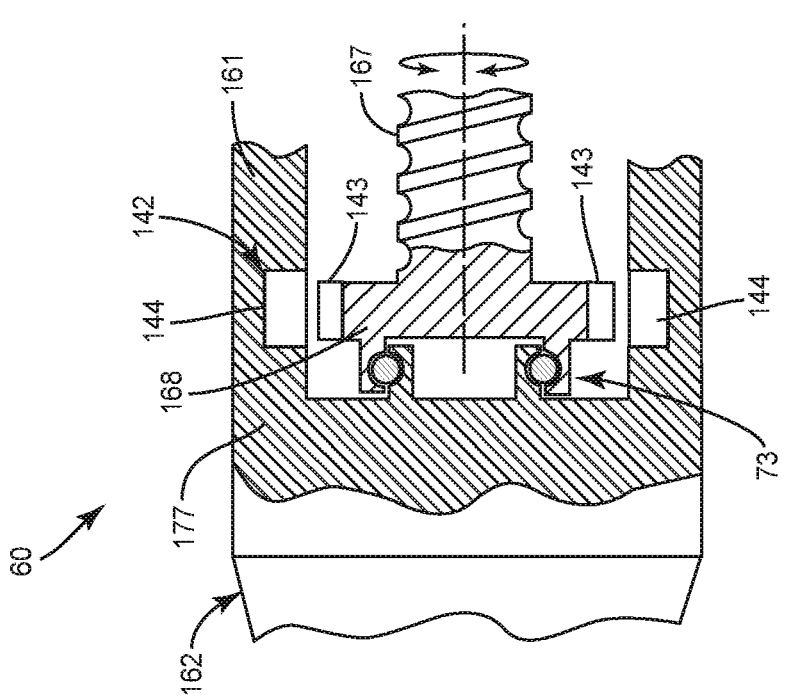
FIG. 16 is a partial section view of a portion of the control member.

FIG. 16 illustrates an example of a flywheel 168 rotatably coupled to the end wall 177 and incorporating a flywheel motor 142 for active control of the rotation of the flywheel 168 in a manner as described above. The flywheel motor 142 can include permanent magnets 143 mounted to the flywheel perimeter. A plurality of permanent magnets 143 can be circumferentially spaced around the flywheel perimeter. A plurality of windings 144 can be circumferentially spaced around the actuator side wall of the housing 161.

Figure 17:
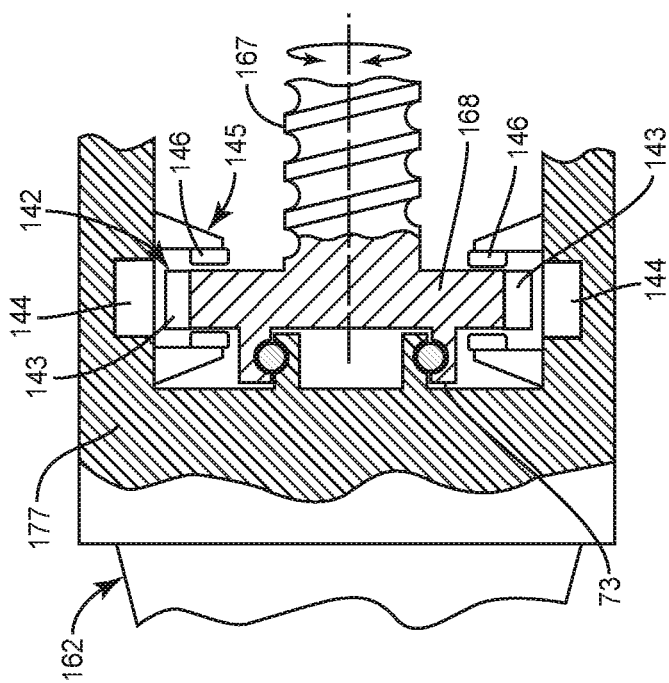
FIG. 17 is a partial section view of a portion of the control member.

FIG. 17 illustrates an example of a flywheel 168 including a brake 145 configured to provide dynamic braking of the flywheel 168. The brake 145 is configured as a disc brake having one or more pairs of brake pads 146 for frictionally engaging opposing axial faces of the flywheel 168. The brake 145 can be configured and operated similar to the arrangement illustrated in FIG. 15 described above.

The use of the integrated inerter and hydraulic actuator allows for a reduction in the overall size and weight of the control devices 60 without the potential for oscillatory response. More specifically, the inerter allows for a reduction in the inertial load on the actuator which, in turn, allows for a reduction in a cross-sectional area of the piston 63 and a decrease in the size and weight of other components of the hydraulic system 20 including reservoirs, tubing diameter, accumulators, pumps, and other components. In this regard, the inerter increases the power density for a hydraulic system 20 where dynamic response is limited by piston cross-sectional area or load inertia.

In use, the control device 60 is attached to the member 11 and a support. The hydraulic actuator is actuated by hydraulic fluid supplied from the hydraulic system 20 to move the control device 60 which in turn moves the member 11. During the movement between the first and second terminals 162, 163, the flywheel 168 is rotationally accelerated simultaneous with the axial acceleration of the first terminal 162 relative to the second terminal 163. The axial acceleration of the first terminal 162 relative to the second terminal 163 is simultaneous with and in proportion to the actuation of the control device 60 by the hydraulic actuator. In this regard, the flywheel 168 rotationally accelerates and decelerates in proportion to the axial acceleration and deceleration of the first terminal 162 relative to the second terminal 163 in correspondence with the actuation of the control device 60 by the hydraulic actuator.

The rotation of the flywheel 168 dampens the movement of the hydraulic actuator. Rotationally accelerating the flywheel 168 acts to reduce actuator load oscillatory amplitude at resonance of the control device 60 and attached member 11. In one example, the inerter can reduce actuator load oscillatory amplitude by at least 50% relative to the oscillatory amplitude for the control device 60 and member 11 actuated by the same actuator but without the inerter.

The dampening by the inerter can include actively controlling the rotation of the flywheel 168 in correspondence with relative axial movement of the piston rod 66 and threaded shaft 167. For example, the inerter can include or incorporate an electric flywheel motor 142 as described above. In some examples, as mentioned above, the actuator can include a linear position sensor (not shown) configured to sense the linear position of the piston 63 within the actuator and generate a signal representative of the piston position. The method can include commutating the flywheel motor 142 in correspondence with the linear position of the piston 63 as represented by the signal generated by the position sensor.

Active control of the flywheel 168 rotation can include accelerating and/or decelerating the flywheel 168 using the flywheel motor 142. For example, the flywheel motor 142 can operate in a manner to apply a torque to the flywheel 168 in correspondence with or in the direction of rotation of the flywheel 168. In this regard, the flywheel motor 142 can assist a commanded direction of motion of the actuator. In some examples, active control of flywheel rotation can include accelerating the flywheel 168 during initiation of actuation by the actuator of the control device 60 toward a commanded position. In this regard, the flywheel motor 142 can rotationally accelerate the flywheel 168 at the start of axial acceleration of the first terminal 162 relative to second terminal 163 by an amount at least partially or completely eliminating the force generated at the first terminal 162 and second terminal 163 due to actuation of the member 11 by the actuator. By using the flywheel motor 142 to rotationally accelerate the flywheel 168 at the start of axial acceleration, the force required to axially move the first terminal 162 relative to the second terminal 163 can be reduced or eliminated which may increase the speed at which the actuator moves the control device 60 toward a commanded position.

Alternatively, the flywheel motor 142 can be operated in a manner to apply a torque to the flywheel 168 in a direction opposite the rotation of the flywheel 168. In this regard, the application of motor-generated torque in a direction opposite the rotation of the flywheel 168 can resist the torque generated by the relative axial acceleration of the first terminal 162 and second terminal 163. In this regard, active control by the flywheel motor 142 can oppose the terminal-developed torque at the end of actuator motion when the commanded position is reached. In this manner, the step of actively controlling rotation of the flywheel 168 can include using the flywheel motor 142 to dynamically brake or decelerate the flywheel 168 as the actuator approaches a commanded position to prevent position overshoot.

In a further example, active control of flywheel 168 rotation can include using a brake 145 to decelerate the flywheel 168 as the actuator approaches a commanded position of the control device 60 to prevent position overshoot of the commanded position. The method can additionally include dynamically braking the rotation of the flywheel 168 to oppose disturbances (e.g., undesirable motion) of the actuator. The step of dynamically braking (e.g., decelerating or reducing rotational speed) of the flywheel 168 can be performed using a brake 145 operatively engageable to the flywheel 168 or operatively engageable to a brake rotor that can be fixedly coupled to the flywheel 168. Alternatively or additionally, the step of dynamically braking the flywheel 168 can be performed using rotational drag generated by the flywheel motor 142 as described above.

The actuation control unit 90 controls the movement of the hydraulic fluid through the hydraulic system 20 to position the member 11 in its commanded position. The actuation control unit 90 uses inputs from the sensors 64, 65, 85 to control one or both of the first pump 21 and the second pump 23 and the valve 70 to supply the hydraulic fluid.

The valve 70 directs the supply hydraulic fluid into the control device 60 through the feed lines and directs the hydraulic fluid from the control device 60 to the return line 25. The valve 70 is adjustable between various settings to control the hydraulic fluid as necessary to ensure proper operation of the control device 60 and movement of the member 11. One or more solenoids 171 controlled by the control unit 90 can control the positioning of the valve 70.

Figure 18:
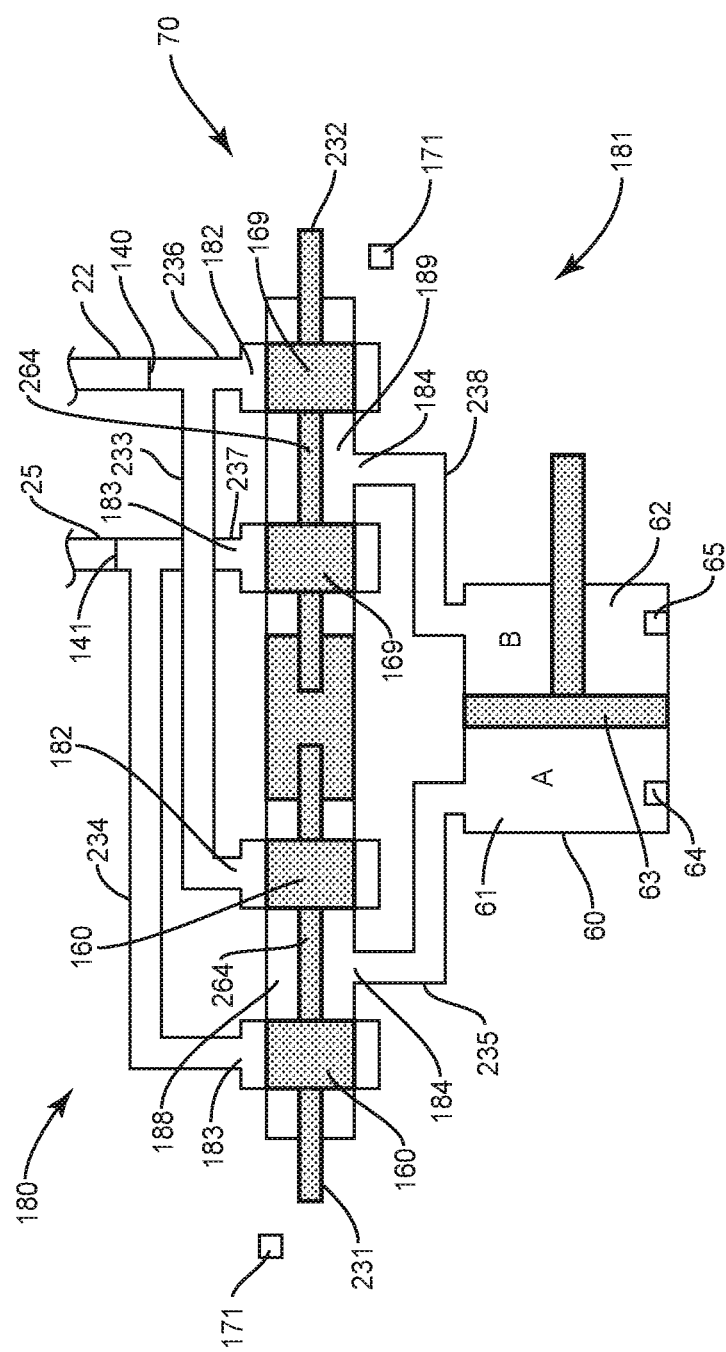
FIG. 18 is a schematic view of a dual spool valve.
Figure 19:
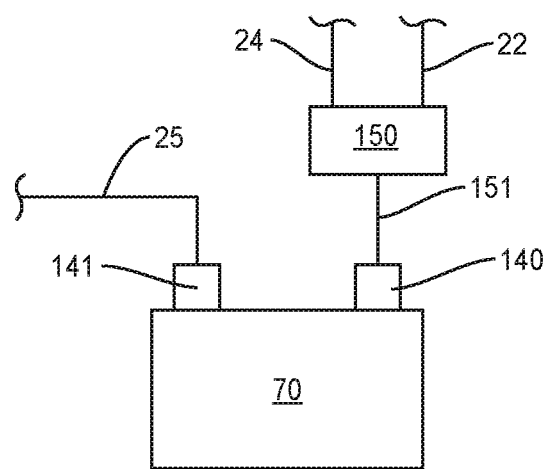
FIG. 19 is a schematic diagram of supply and return lines and a dual spool valve.

FIG. 18 illustrates a valve 70 that controls the hydraulic fluid flow to and from the control device 60. The valve 70 includes a first port 140 to receive hydraulic fluid and a second port 141 to discharge hydraulic fluid to the return line 25. As illustrated in FIG. 19, a manifold 150 can receive hydraulic fluid from both supply line 22 and boost line 24 and output the hydraulic fluid through line 151 and into the first port 140 of the valve 70. The manifold 150 can be integrated with the valve 70 or can be positioned upstream from the valve 70.

As illustrated in FIG. 18, the valve 70 includes a first valve section 180 and a second valve section 181. The first valve section 180 includes a first manifold 188 and the second valve section 181 includes a second manifold 189. Each manifold 188, 189 includes a first supply port 182, a second return port 183, and a third actuator port 184. A line 233 extends between the first port 140 and the first manifold 188. A line 236 extends from the first port 140 to the second manifold 189. Further, a line 234 extends between the first manifold 188 and the second port 141. A line 237 extends between the second manifold 189 and the second port 141. A line 235 extends between the first manifold 188 and the first chamber 61. A line 238 extends between the second manifold 189 and the second chamber 62.

The valve 70 is a dual spool valve that includes a first spool 231 and a second spool 232. Each of the spools 231, 232 is individually controllable and can be positioned regardless of the position of the opposing spool 231, 232. The first spool 231 includes a pair of blocks 160 positioned along a shaft 264. Likewise, the second spool 232 includes blocks 169 positioned along a shaft 264. Solenoids 171 are operatively connected to the first and second spools 231, 232 and are operated by the actuation control unit 90 to control their positioning within the respective manifolds 188, 189. The first spool 231 controls the flow of hydraulic fluid into and out of a first chamber 61 of the actuator. The second spool 232 controls the flow of hydraulic fluid into and out of a second chamber 62. The movement of hydraulic fluid into and out of the chambers 61, 62 controls the movement of a piston 63 of the actuator which is connected to the member 11. FIG. 18 includes each of the first and second spools 231, 232 in closed positions to prevent the flow of hydraulic fluid into or out of the actuator.

The positioning of the valve 70 can be based on a commanded position received from the control system 99. The control system 99 or the actuation control unit 90 can determine a rate of the member 11 which is the direction and speed required for the member 11 to be moved.

Figure 20:
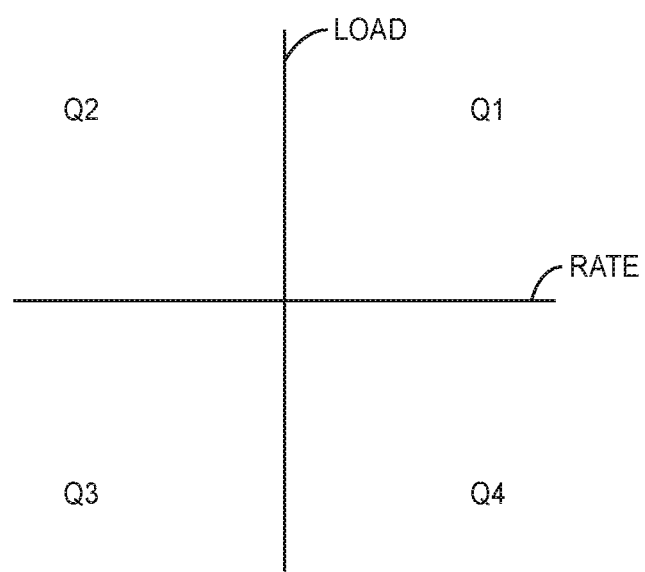
FIG. 20 is a schematic diagram of four quadrant control with a load and a rate for a control member.

FIG. 20 illustrates a diagram of the forces acting on the piston 63 through the member 11 that affect the required movement of hydraulic fluid through the hydraulic system 20. A first axis (i.e., the x-axis) represents the rate of movement of the piston 63 and thus the member 11. The rate can be either positive when the piston 63 moves in a first direction and negative when the piston 63 moves in the opposing second direction. The second axis (i.e., the y-axis) is the load placed on the piston 63 through the member 11. The load can be positive when applied to the piston 63 in a first direction and negative when applied in a second direction. The diagram of FIG. 20 includes the four quadrants Q1, Q2, Q3, and Q4 based on the rate and load requirements.

The actuation control unit 90 uses one or more of the sensed pressures of the hydraulic fluid in one or both of the first and second chambers 61, 62 and along one or more of the supply line 22 and boost line 24 in combination with the commanded rate from the control system 99 to determine the positions of the first and second spools 231, 232 and then derive the mode.

Figure 21:
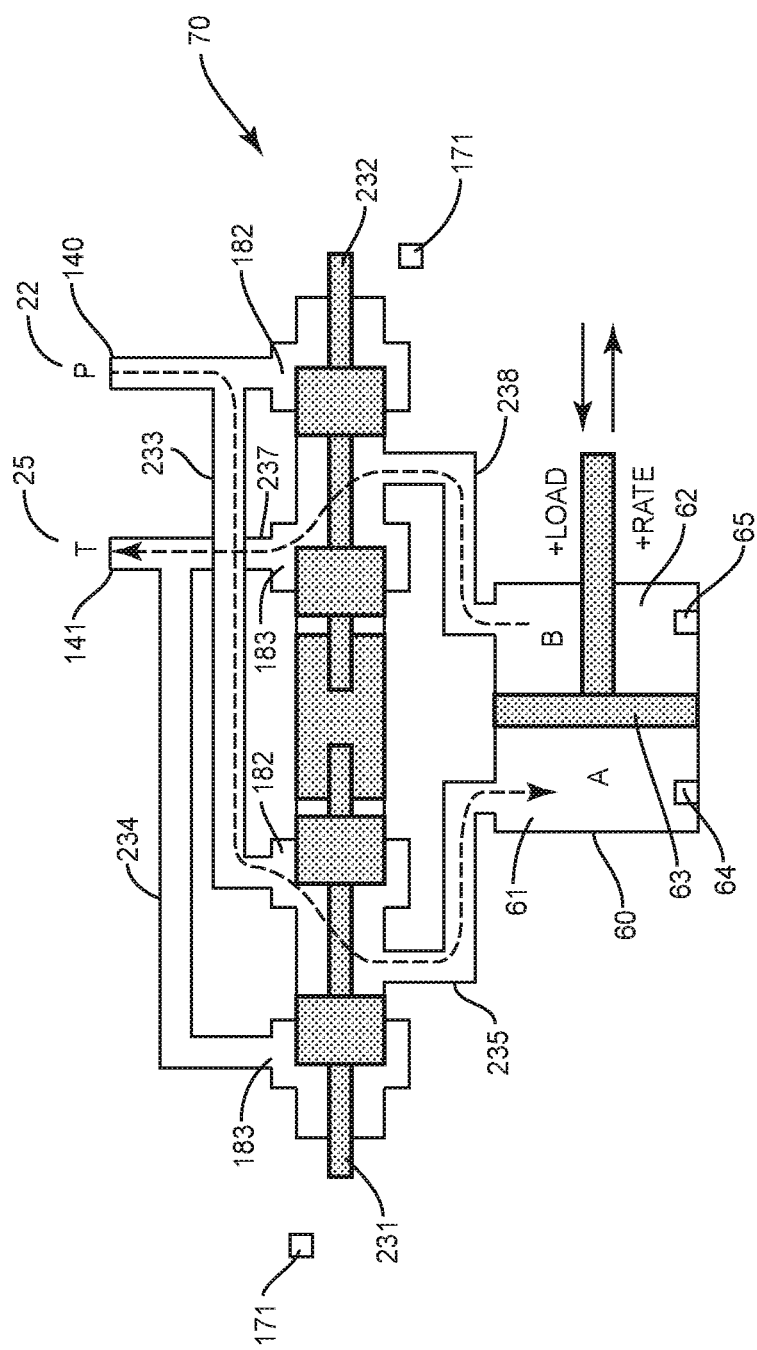
FIG. 21 is a schematic view of a dual spool valve operating in a first quadrant.

FIG. 21 illustrates the actuator of the control device 60 within the first quadrant Q1 with a positive load and a positive rate. In the first quadrant Q1, the rate is controlled by the flow of hydraulic fluid through the port 140 and into the first chamber 61. As illustrated, the first spool 231 is positioned in a second position for hydraulic fluid from the supply line 22 to enter into the first chamber 61 through lines 233-235. The first spool 231 also blocks port 183. The second spool 232 is in a first position to open the port 183 of the second chamber 62 to allow hydraulic fluid to exit to the return line 25 through lines 238-237. The second spool 232 also blocks port 182 in this first position.

Figure 22:
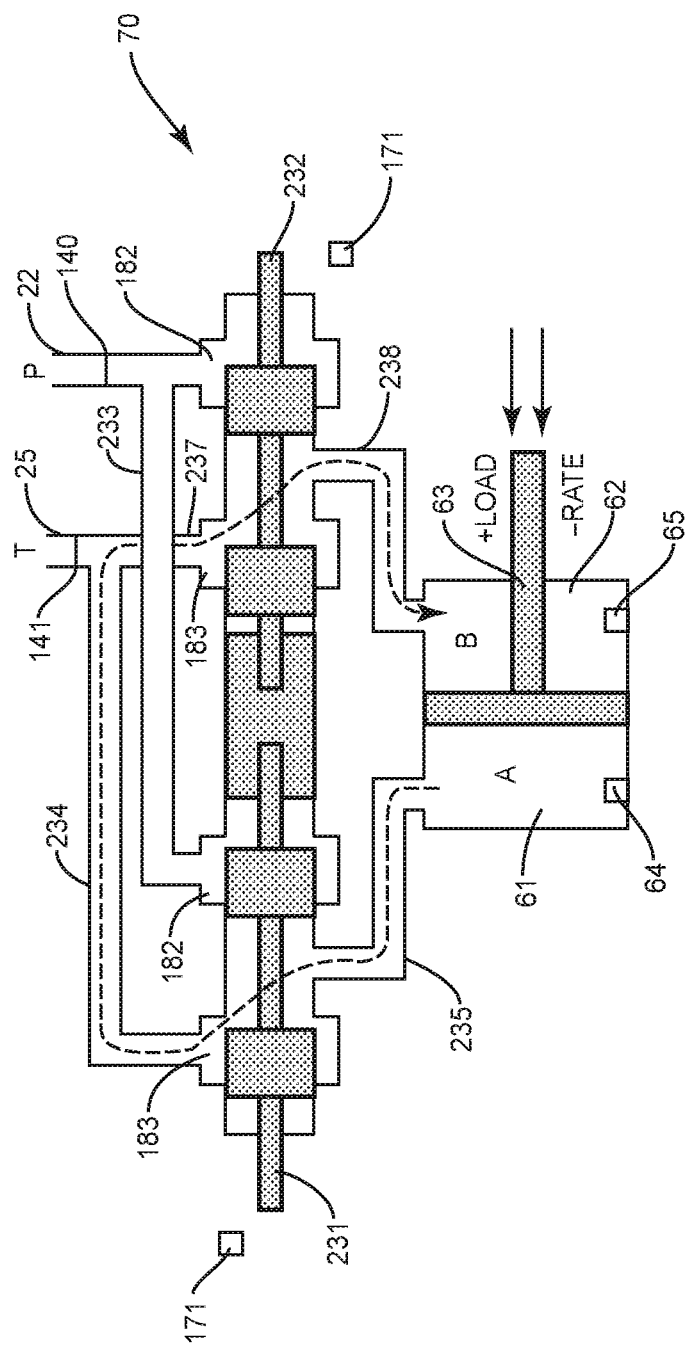
FIG. 22 is a schematic view of a dual spool valve operating in a second quadrant.

FIG. 22 illustrates the actuator of the control device 60 within the second quadrant Q2 having a positive load applied to the piston 63 and a negative rate. In the second quadrant Q2, the rate is controlled by the flow of hydraulic fluid out of the first chamber 61. Instead of outputting the hydraulic fluid from the first chamber 61 to the return line 25, the exiting hydraulic fluid is directed from the first chamber 61 to the second chamber 62. Regenerating the hydraulic fluid from the first chamber 61 to the second chamber 62 reduces the number of pressure cycles that are required to otherwise introduce hydraulic fluid into the actuator of the control device 60 from the supply line 22 and move the hydraulic fluid into and through the return line 25.

As illustrated, the first spool 231 is in a first position that opens port 183 and blocks port 182. The second spool 232 is in the first position to open port 183 and block port 182. This allows hydraulic fluid from the first chamber 61 to move to the second chamber 62. The movement of the hydraulic fluid to the second chamber 62 can be caused by a pressure drop in the second chamber 62 due to the movement of the piston 63 towards the first chamber 61.

Figure 23:
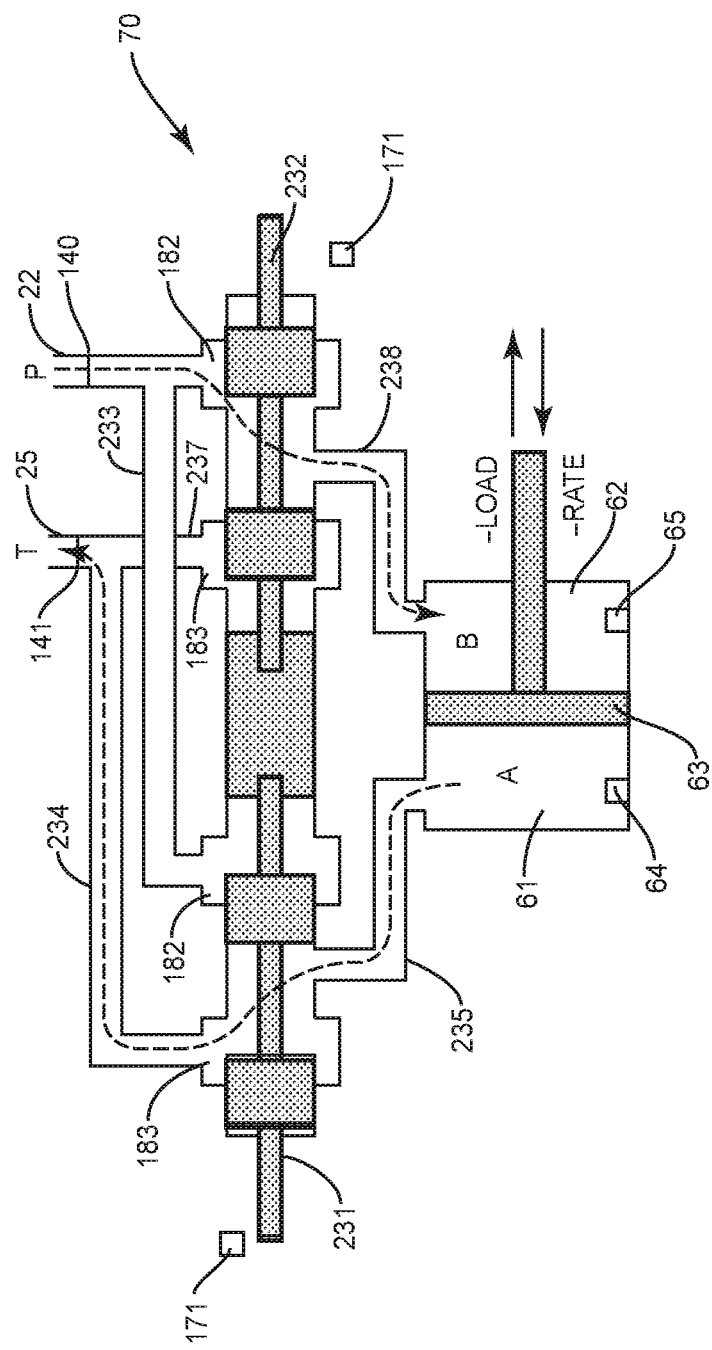
FIG. 23 is a schematic view of a dual spool valve operating in a third quadrant.

FIG. 23 illustrates the actuator of the control device 60 within the third quadrant Q3 having a negative load and a negative rate. In the third quadrant Q3, the rate is controlled by the flow of hydraulic fluid into the second chamber 62 from the first port 140. The first spool 231 is in the first position to open port 183 and block port 182. The second port is in the second position to block port 183 and open port 182. The second spool 232 is positioned for hydraulic fluid from the supply line 22 to move through lines 236-238 and into the second chamber 62. The first spool 231 is positioned for the hydraulic fluid to exit the first chamber 61 to the return line 25 through lines 235-234.

Figure 24:
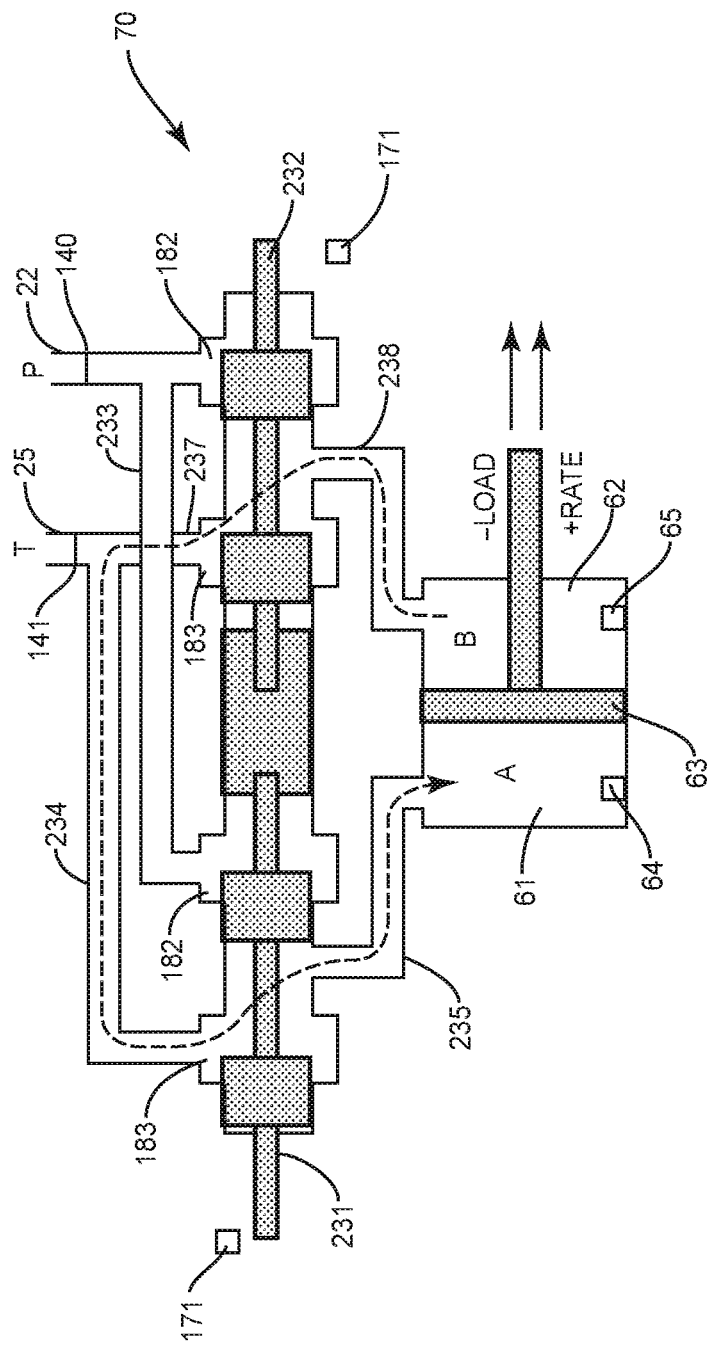
FIG. 24 is a schematic view of a dual spool valve in a fourth quadrant.

FIG. 24 illustrates the control device 60 within the fourth quadrant with a negative load and a positive rate. In the fourth quadrant Q4, the rate is controlled by the flow of hydraulic fluid out of the second chamber 62. The first spool 231 is in the first position to open port 183 and block port 182. The second spool 232 is in the first position to open port 183 and block port 182. The second spool 232 is positioned to allow hydraulic fluid to flow out of the second chamber 62 through lines 238-237. The first spool 231 is positioned for the hydraulic fluid to move through lines 234-235 and into the first chamber 61. Again, this configuration regenerates the existing hydraulic fluid within the actuator of the control device 60 and thus reduces the number of needed pressure cycles to move hydraulic fluid through supply line 22 into and out of the control device 60 through the return line 25.

The valve 70 provides for the actuation control unit 90 to have four quadrant control of the control device 60. The actuation control unit 90 controls the solenoids 171 to position the first and second spools 231, 232 accordingly to provide for the control. Table 1 below lists the quadrants in which a boost is supplied by the hydraulic fluid entering through the supply line 22. The determination of boost is based on the hydraulic fluid P entering through the supply line 22, hydraulic fluid A in the first chamber 61, and the hydraulic fluid B in the second chamber 62. Table 2 includes the valve positioning for movement of the fluid for control of the actuator of the control device 60.

TABLE 1

| Boost Quadrants | Negative Rate | Positive Rate |
| --- | --- | --- |
| Positive force | Q2: A ≥ B, no boost | Q1: P ≥ A + δP |
| Negative force | Q3: P ≥ B + δP | Q4: B ≥ A, no boost |

TABLE 2

| Control Quadrants | Negative Rate | Positive Rate |
| --- | --- | --- |
| Positive force | Q2: regeneration A − B | Q1: P − A & B − T |
| Negative force | Q3: P − B & A − T | Q4: regeneration B − A |

For quadrant 1 Q1 (see FIG. 21), control occurs through hydraulic fluid entering into the first chamber 61 through the port 140. This includes the movement of hydraulic fluid from the supply line 22 to the first chamber 61 (P–A) and the movement of hydraulic fluid from the second chamber 62 to the return line 25 (B–T). A boost is applied when the pressure at the supply line 22 is less than the pressure at the first chamber 61 plus a margin (P≥A+δP). The margin provides for application of the load above the required pressure to account for various forces on the hydraulic fluid, such as surface friction and surface-inertia acceleration. One design includes a system pressure of 1200 psi and the margin is 300 psi.

For quadrant 2 Q2, no boost is required from the hydraulic fluid entering through the supply line 22 since the pressure A in the first chamber 61 is greater than or equal to the pressure B in the second chamber 62 (A≥B). Control in the second quadrant Q2 occurs through hydraulic fluid exiting the first chamber 61 and entering the second chamber 62 (A–B).

For quadrant 3 Q3, control occurs through the movement of hydraulic fluid from the supply line 22 into the second chamber 62 (P–B) and movement of hydraulic fluid from the first chamber 61 to the return line 25 (A–T). A boost is applied when the pressure at the supply line 22 is less than the pressure at the second chamber 62 plus the margin (P≥B+δP).

For quadrant 4 Q4, no boost is required from the hydraulic fluid entering through the supply line 22 since the pressure B in the second chamber 62 is greater than or equal to the pressure A in the first chamber 61 (B≥A). Control in the fourth quadrant Q4 occurs through hydraulic fluid exiting the second chamber 62 and entering the first chamber 62 (B–A).

Boost control when a hydraulic system 20 supports multiple control devices 60 provides for determining an error for each of the actuators. The largest error amongst the control devices 60 is then used to control the system pressure. This ensures that the hydraulic system 20 is able to adequately support each of the control devices 60. For each actuator, the error in the first quadrant Q1 is e=(A+δP)–P. In the third quadrant Q3, the error e=(B+δP)–P. For the second and fourth quadrants Q2, Q4, the error is equal to zero.

Figure 25:
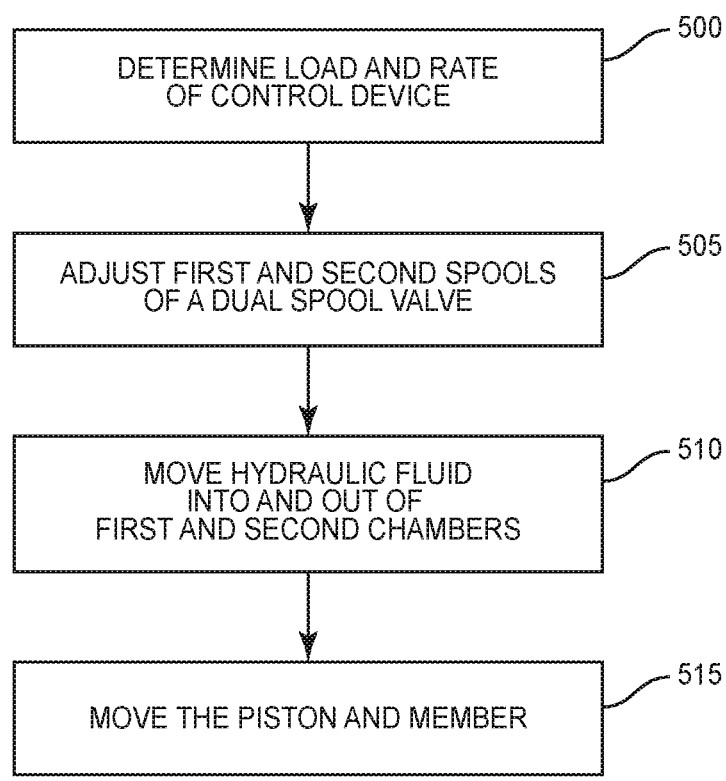
FIG. 25 is a flowchart diagram of a method of operating a control member to move a member.

FIG. 25 illustrates a method of controlling the valve 70 to change the orientation of the member 11. The load and commanded rate of the control device 60 is determined by the actuation control unit 90 (block 500). The commanded rate can be a function of a commanded position instruction received from the control system 99. The load can be determined based on the pressure of the hydraulic fluid in one or both of the first and second chambers 61, 62. The actuation control unit 90 then signals the solenoids 171 to position the first and second spools 231, 232 (block 505). The hydraulic fluid is then moved into and out of the first and second chambers 61, 62. Dependent upon the quadrant, this can include introducing hydraulic fluid from the supply line 22 and/or moving the hydraulic fluid between the first and second chambers 61, 62. The moving hydraulic fluid causes the piston 63 of the control device 60 to move the member 11 (block 515).

Figure 26:
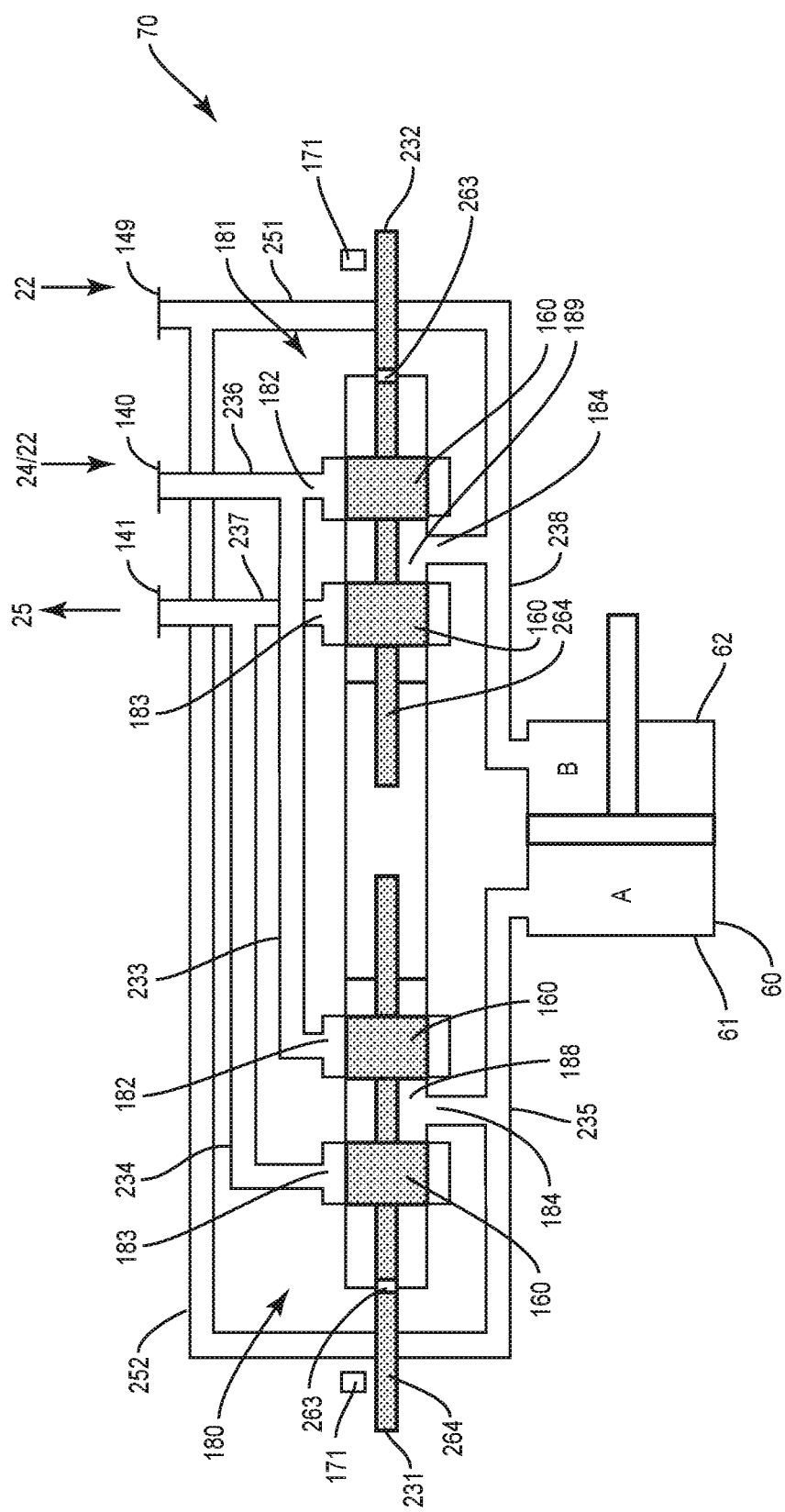
FIG. 26 is a schematic view of a dual spool valve.
Figure 27:
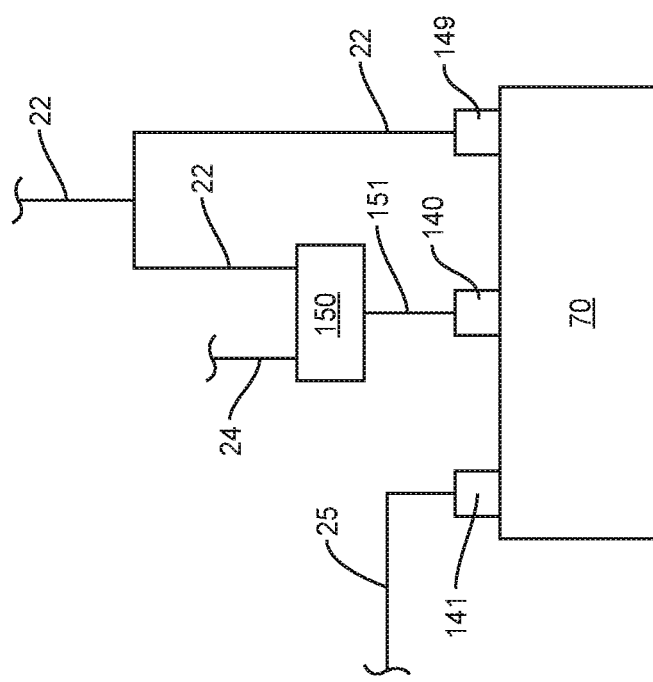
FIG. 27 is a schematic diagram of supply and return lines and a dual spool valve.

The dual spool valve 70 can also be configured to provide operation of the control device 60 in the event that one of an issue with the operation of one of the spools 231, 232. The valve 70 is also configured to operate under normal operating conditions in which the spools 231, 232 are properly operating. FIG. 26 illustrates a valve 70 that includes a first port 140 to receive hydraulic fluid, a second port 141 to discharge hydraulic fluid to the return line 25, and a third port 149 to receive hydraulic fluid. In one design, the boost line 24 and/or the supply line 22 supplies hydraulic fluid to the first port 140 and the supply line 22 supplies hydraulic fluid to the third port 149. As illustrated in FIG. 27, the supply line 22 can supply hydraulic fluid to both the first and third ports 140, 149. A manifold 150 receives hydraulic fluid from both supply line 22 and boost line 24 and outputs the hydraulic fluid through line 151 and into the first port 140 of the valve 70. The manifold 150 can be integrated with the valve 70 or can be positioned upstream from the valve 70.

As illustrated in FIG. 26, the valve 70 includes a first valve section 180 and a second valve section 181. The first valve section 180 includes a first manifold 188 and the second valve section 181 includes a second manifold 189. Each manifold 188, 189 includes a first supply port 182, a second return port 183, and a third actuator port 184.

A series of lines extend through the interior of the valve 70 to supply and return the hydraulic fluid. Line 233 extends between the first port 140 and the first manifold 188. Line 236 extends from the first port 140 to the second manifold 189. Line 234 extends between the first manifold 188 and the second port 141. Line 237 extends between the second manifold 189 and the second port 141. Line 235 extends between the first manifold 188 and the first chamber 61. Line 238 extends between the second manifold 189 and the second chamber 62. Line 251 extends between third port 149 and the second chamber 62 (through line 238). Line 252 extends between the third port 149 and the first chamber 61 (through line 235).

The valve 70 is a dual spool valve that includes a first spool 231 and a second spool 232. Each of the spools 231, 232 is individually controllable and can be positioned regardless of the position of the opposing spool 231, 232. The first spool 231 includes a pair of blocks 160 positioned along a shaft 264. An orifice 263 extends through the shaft 264. The second spool 232 can be the same as the first spool 231, just oriented in an opposing manner to be positioned in the second manifold 189. The first and second spools 231, 232 can include the same or different shapes and/or sizes. One design includes the first and second spools 231, 232 having the same shape and size.

Solenoids 171 are operatively connected to the first and second spools 231, 232 and are controlled by the actuation control unit 90. The solenoids 171 provide for positioning the first and second spools 231, 232 within the respective manifolds 188, 189. The first spool 231 controls the flow of hydraulic fluid into and out of a first chamber 61 and the second spool 232 controls the flow of hydraulic fluid into and out of a second chamber 62. The movement of hydraulic fluid into and out of the chambers 61, 62 controls the movement of a piston 63 which is connected to the member 11.

FIG. 26 includes the first spool 231 positioned with a section of the shaft 264 extending across line 252. The second spool 232 is positioned with a section of shaft 264 extending across line 251.

The positioning of the valve 70 is also determined based on a commanded position received from the control system 99. The control system 99 or the actuation control unit 90 can determine a rate of the member 11 which is the direction and speed required for the member 11 to be moved.

Figure 28:
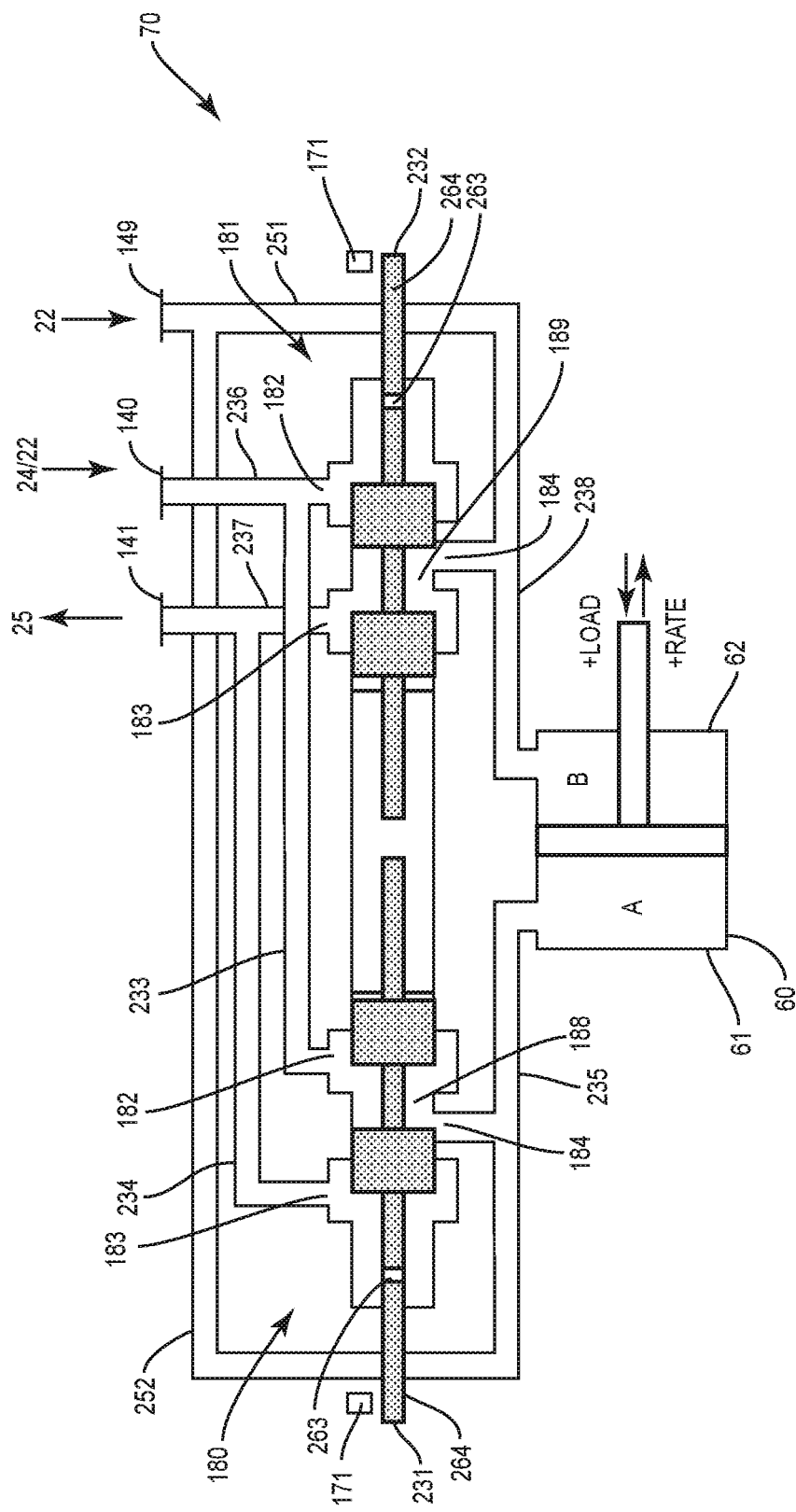
FIG. 28 is a schematic view of a dual spool valve operating in a first quadrant.

FIG. 28 illustrates the control device 60 within the first quadrant Q1 with a positive load and a positive rate. In the first quadrant Q1, the rate is controlled by the flow of hydraulic fluid through the port 140 and into the first chamber 61. As illustrated, the first spool 231 is positioned in a second position for hydraulic fluid to enter into the first chamber 61 through lines 233-235. The first spool 231 also blocks port 183. The second spool 232 is in a first position to open the port 183 of the second chamber 62 to allow hydraulic fluid to exit to the return line 25 through lines 238-237. The second spool 232 also blocks port 182 in this first position.

The shaft 264 of the first spool 231 extends across line 252 thus preventing hydraulic fluid from entering or exiting the first chamber 61 through the line 252. Shaft 264 of the second spool 231 extends across line 251 and prevents hydraulic fluid from entering or exiting the second chamber 62 through line 251.

Figure 29:
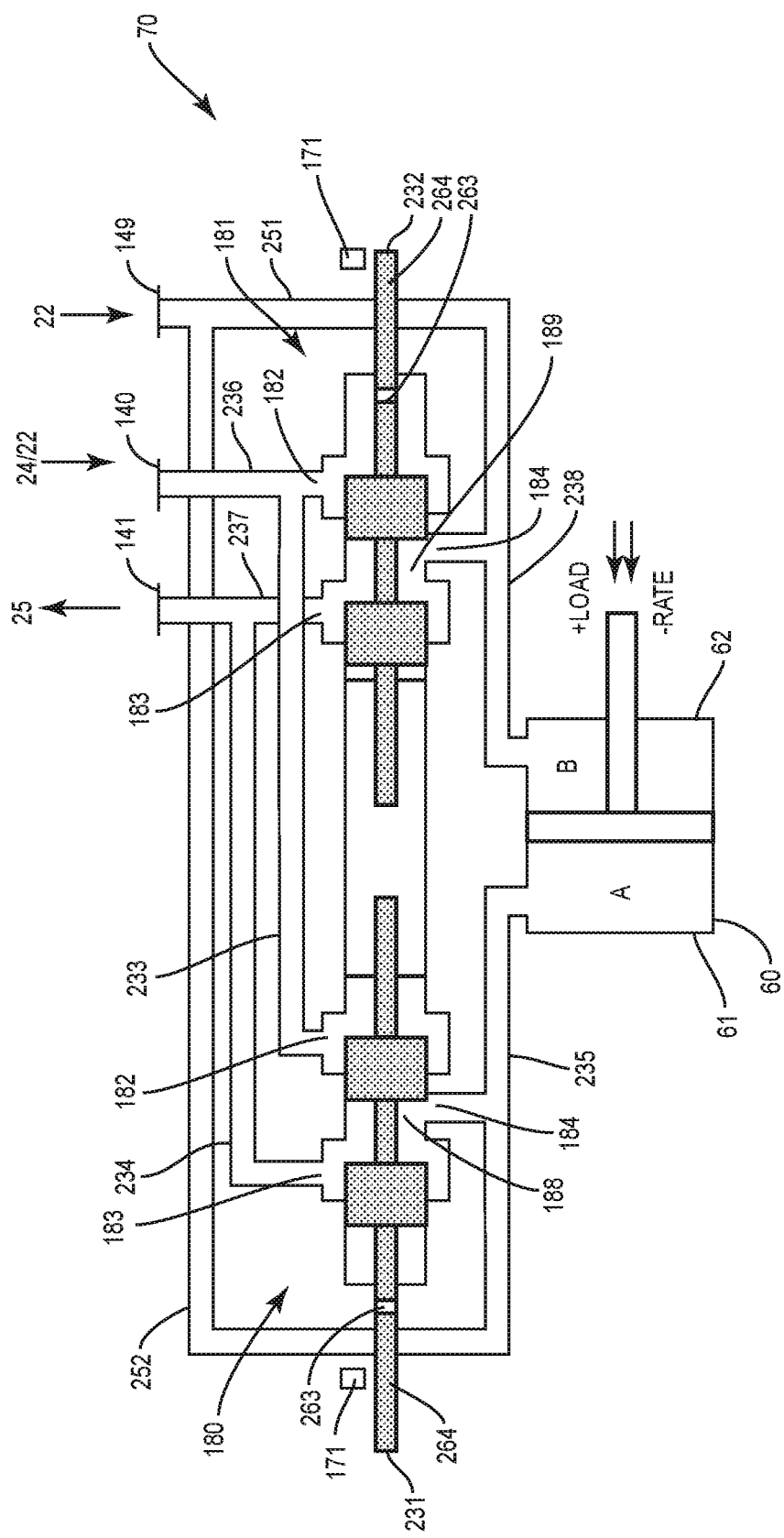
FIG. 29 is a schematic view of a dual spool valve operating in a second quadrant.

FIG. 29 illustrates the control device 60 within the second quadrant Q2 having a positive load applied to the piston 63 and a negative rate. In the second quadrant Q2, the rate is controlled by the flow of hydraulic fluid out of the first chamber 61. Instead of outputting the hydraulic fluid from the first chamber 61 to the return line 25, the exiting hydraulic fluid is directed from the first chamber 61 to the second chamber 62. Regenerating the hydraulic fluid from the first chamber 61 to the second chamber 62 reduces the number of pressure cycles that are required to otherwise introduce hydraulic fluid into the control device 60 from the supply line 22 and move the hydraulic fluid into and through the return line 25. As illustrated, the first spool 231 is in a first position that opens port 183 and blocks port 182. The second spool 232 is in the first position to open port 183 and block port 182. This allows hydraulic fluid from the first chamber 61 to move to the second chamber 62. The movement of the hydraulic fluid to the second chamber 62 can be caused by a pressure drop in the second chamber 62 due to the movement of the piston 63 towards the first chamber 61.

In the second quadrant Q2, the shaft 264 of the first spool 231 extends across line 252 thus preventing hydraulic fluid from entering or exiting the first chamber 61 through the line 252. Shaft 264 of the second spool 231 extends across line 251 and prevents hydraulic fluid from entering or exiting the second chamber 62 through line 251.

Figure 30:
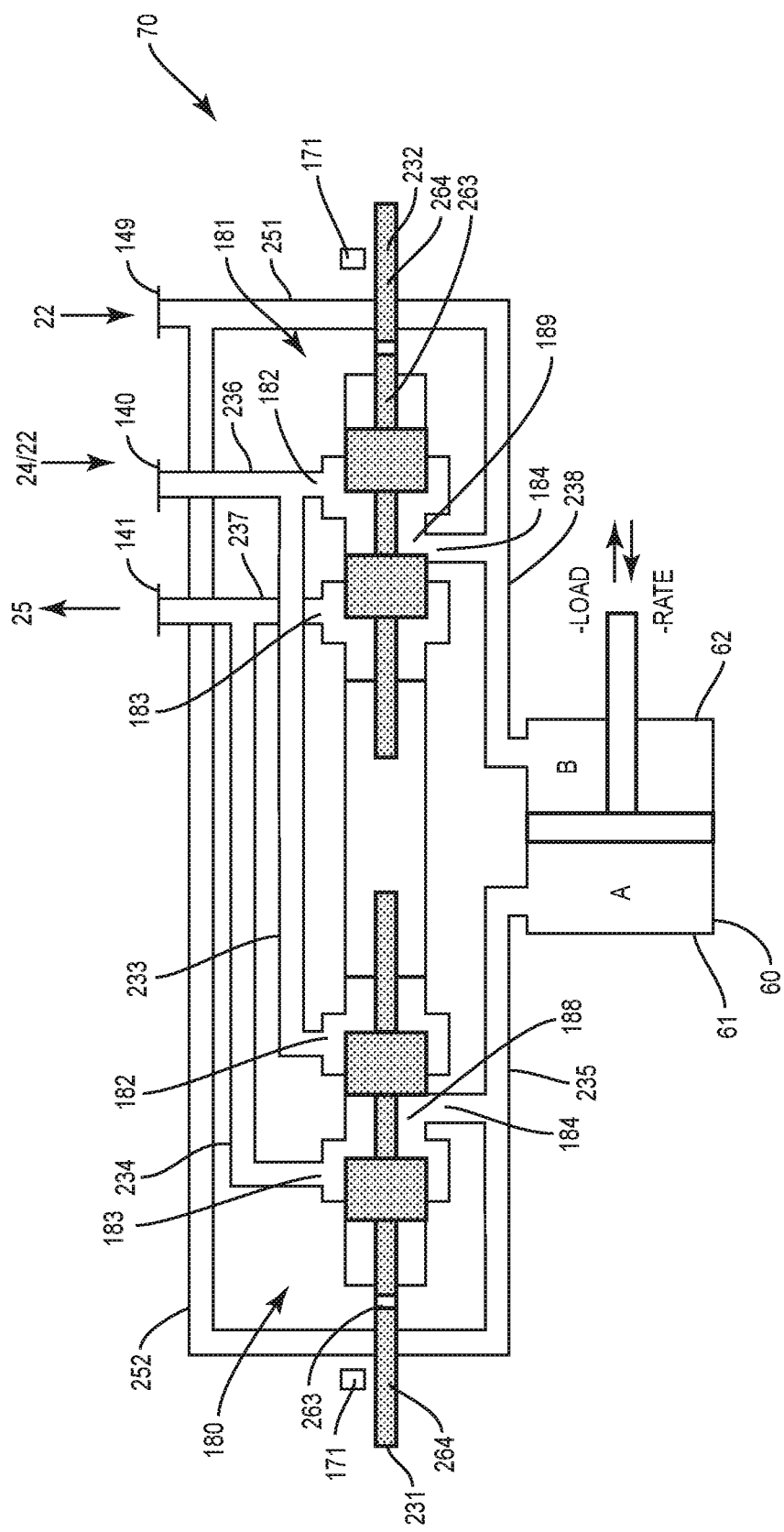
FIG. 30 is a schematic view of a dual spool valve operating in a third quadrant.

FIG. 30 illustrates the control device 60 within the third quadrant Q3 having a negative load and negative rate. In the third quadrant Q3, the rate is controlled by the flow of hydraulic fluid into the second chamber 62 from the first port 140. The first spool 231 is in the first position to open port 183 and block port 182. The second port is in the second position to block port 183 and open port 182. The second spool 232 is positioned for hydraulic fluid to move through lines 236-238 and into the second chamber 62. The first spool 231 is positioned for the hydraulic fluid to exit the first chamber 61 to the return line 25 through lines 235-234. The shaft 264 of the first spool 231 extends across line 252 thus preventing hydraulic fluid from entering or exiting the first chamber 61 through the line 152. Shaft 264 of the second spool 231 extends across line 251 and prevents hydraulic fluid from entering or exiting the second chamber 62 through line 251.

Figure 31:
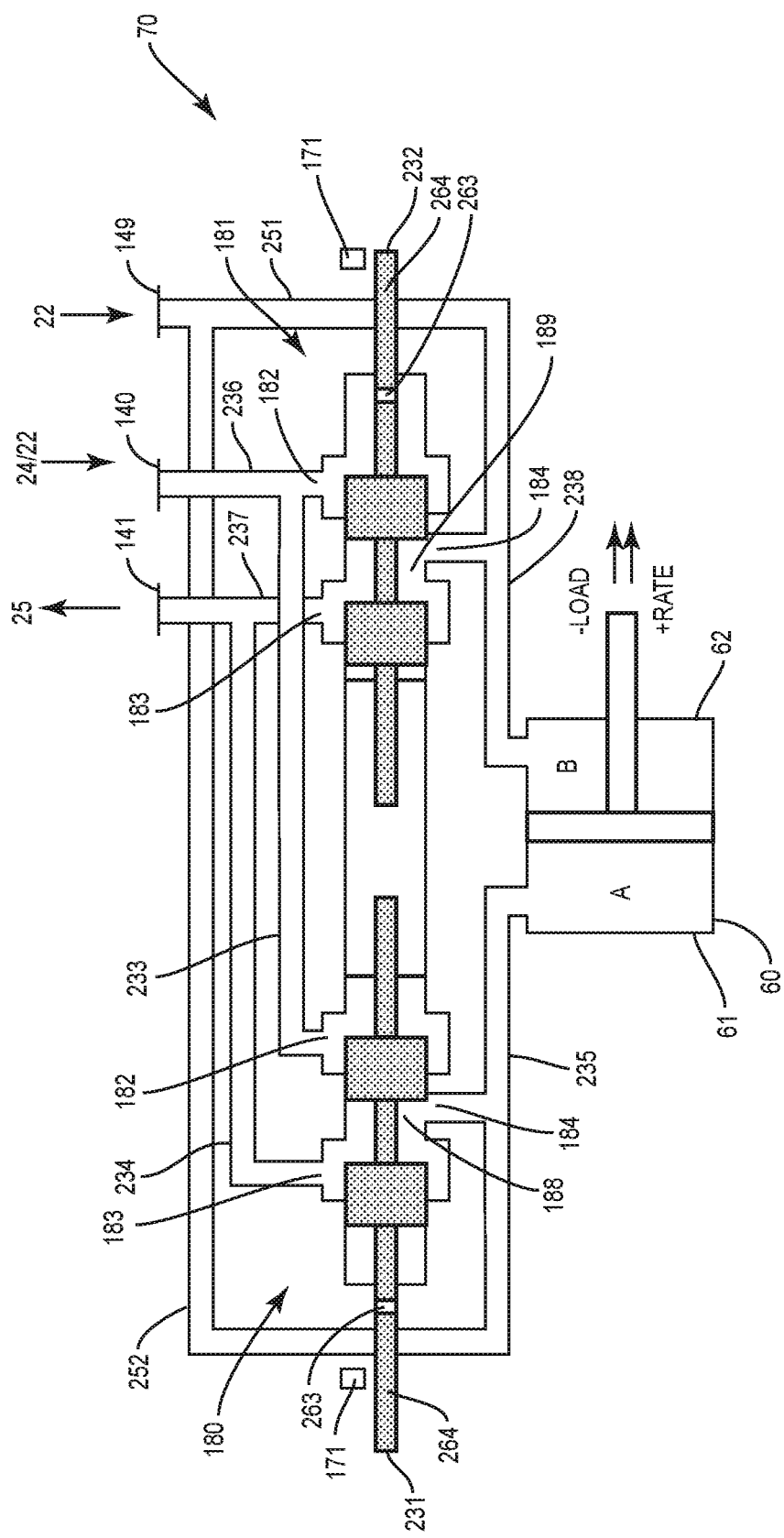
FIG. 31 is a schematic view of a dual spool valve in a fourth quadrant.

FIG. 31 illustrates the control device 60 within the fourth quadrant with a negative load and a positive rate. In the fourth quadrant Q4, the rate is controlled by the flow of hydraulic fluid out of the second chamber 62. The first spool 231 is in the first position to open port 183 and block port 182. The second spool 232 is in the first position to open port 183 and block port 182. The second spool 232 is positioned to allow hydraulic fluid to flow out of the second chamber 62 through lines 238-237. The first spool 231 is positioned for the hydraulic fluid to move through lines 234-235 and into the first chamber 61. Again, this configuration regenerates the existing hydraulic fluid within the control device 60 and thus reduces the number of needed pressure cycles to move hydraulic fluid into and out of the control device 60 through the return line 25. The shaft 264 of the first spool 231 extends across line 252 thus preventing hydraulic fluid from entering or exiting the first chamber 61 through the line 252. Shaft 264 of the second spool 232 extends across line 251 and prevents hydraulic fluid from entering or exiting the second chamber 62 through line 251.

The valve 70 provides for the actuation control unit 90 to have four quadrant control of the control device 60. The actuation control unit 90 controls the solenoids 171 to position the first and second spools 231, 232 accordingly to provide for the control. Table 1 below lists the quadrants in which a boost is supplied by the hydraulic fluid entering through the supply line 22. The determination of boost is based on the hydraulic fluid P entering through the supply line 22, hydraulic fluid A in the first chamber 61, and the hydraulic fluid B in the second chamber 62. Table 2 includes the valve positioning for movement of the fluid for control of the control device 60.

TABLE 1

| Boost Quadrants | Negative Rate | Positive Rate |
| --- | --- | --- |
| Positive force | Q2: A ≥ B, no boost | Q1: P ≥ A + δP |
| Negative force | Q3: P ≥ B + δP | Q4: B ≥ A, no boost |

TABLE 2

| Control Quadrants | Negative Rate | Positive Rate |
| --- | --- | --- |
| Positive force | Q2: regeneration A − B | Q1: P − A & B − T |
| Negative force | Q3: P − B & A − T | Q4: regeneration B − A |

For quadrant 1 Q1 (see FIG. 28), control occurs through hydraulic fluid entering into the first chamber 61 through the port 140. This includes the movement of hydraulic fluid from the supply line 22 to the first chamber 61 (P-A) and the movement of hydraulic fluid from the second chamber 62 to the return line 25 (B-T). A boost is applied when the pressure at the supply line 22 is less than the pressure at the first chamber 61 plus a margin (P≥A+δP). The margin provides for application of the load above the required pressure to account for various forces on the hydraulic fluid, such as surface friction and surface-inertia acceleration. One design includes a system pressure of 1200 psi and the margin is 300 psi.

For quadrant 2 Q2, no boost is required from the hydraulic fluid entering through the supply line 22 since the pressure A in the first chamber 61 is greater than or equal to the pressure B in the second chamber 62 (A≥B). Control in the second quadrant Q2 occurs through hydraulic fluid exiting the first chamber 61 and entering the second chamber 62 (A-B).

For quadrant 3 Q3, control occurs through the movement of hydraulic fluid from the supply line 22 into the second chamber 62 (P-B) and movement of hydraulic fluid from the first chamber 61 to the return line 25 (A-T). A boost is applied when the pressure at the supply line 22 is less than the pressure at the second chamber 62 plus the margin (P≥B+δP).

For quadrant 4 Q4, no boost is required from the hydraulic fluid entering through the supply line 22 since the pressure B in the second chamber 62 is greater than or equal to the pressure A in the first chamber 61 (B≥A). Control in the fourth quadrant Q4 occurs through hydraulic fluid exiting the second chamber 62 and entering the first chamber 62 (B-A).

In each of the quadrants, the shafts 264 of the spools 231, 232 extend across lines 251, 252 respectively to prevent hydraulic fluid from flowing through these lines into or out of the control device 60. Operation of this valve 70 when in proper operational condition is the same as that disclosed in FIG. 25.

The valve 70 is further configured to operate with four quadrant control of the control device 60 in the event of a failure of one of the valve sections 180, 181. A failure can include but is not limited to a difference in sensed pressure between the second pump pressure and the pressure within one or both the first and second chambers 61, 62, and sensing that the position of one of the first or second spools 231, 232 does not change when commanded to a different position.

In one design, upon detecting a failure in the valve 70 of one of the valve sections 180, 181, the actuation control unit 90 can revert back to non-differential control of the valve 70. This can include operating the first pump 21 at an elevated pressure, and the second pump 23 at an intermediate pressure that is well below its peak capability. One specific design operates the second pump 23 at an intermediate pressure of 5000 psi, which is well below its peak capability of 8000-9000 psi. The first pump 21 can be operated at 3000 psi rather than 1200 psi.

FIGS. 32-35 illustrate the positioning of the valve 70 in the event that of failure of the second valve section 181. As illustrated, the second spool 232 goes to a third position in which the orifice 263 is aligned with the line 251. This positioning allows for the flow of hydraulic fluid along line 251 and through the orifice 263 and into and out of the second chamber 62. In one design, the second spool 232 is biased towards the third position. When the valve section 181 is functioning properly, the solenoid 171 maintains the second spool 232 in one of the first and second positions as disclosed above. In the event of a failure, the solenoid 171 can be de-energized causing the second spool 232 to go to the third position. The third position also includes the second spool 232 positioned to prevent hydraulic fluid from moving through the second manifold 189 to or from the second chamber 62. This can include a block 160 of the second spool 232 positioned across the actuator port 184. With the second valve section 181 being in the third position, the first valve section 180 is adjustable to control the flow of hydraulic fluid into and out of the first chamber 61.

Figure 32:
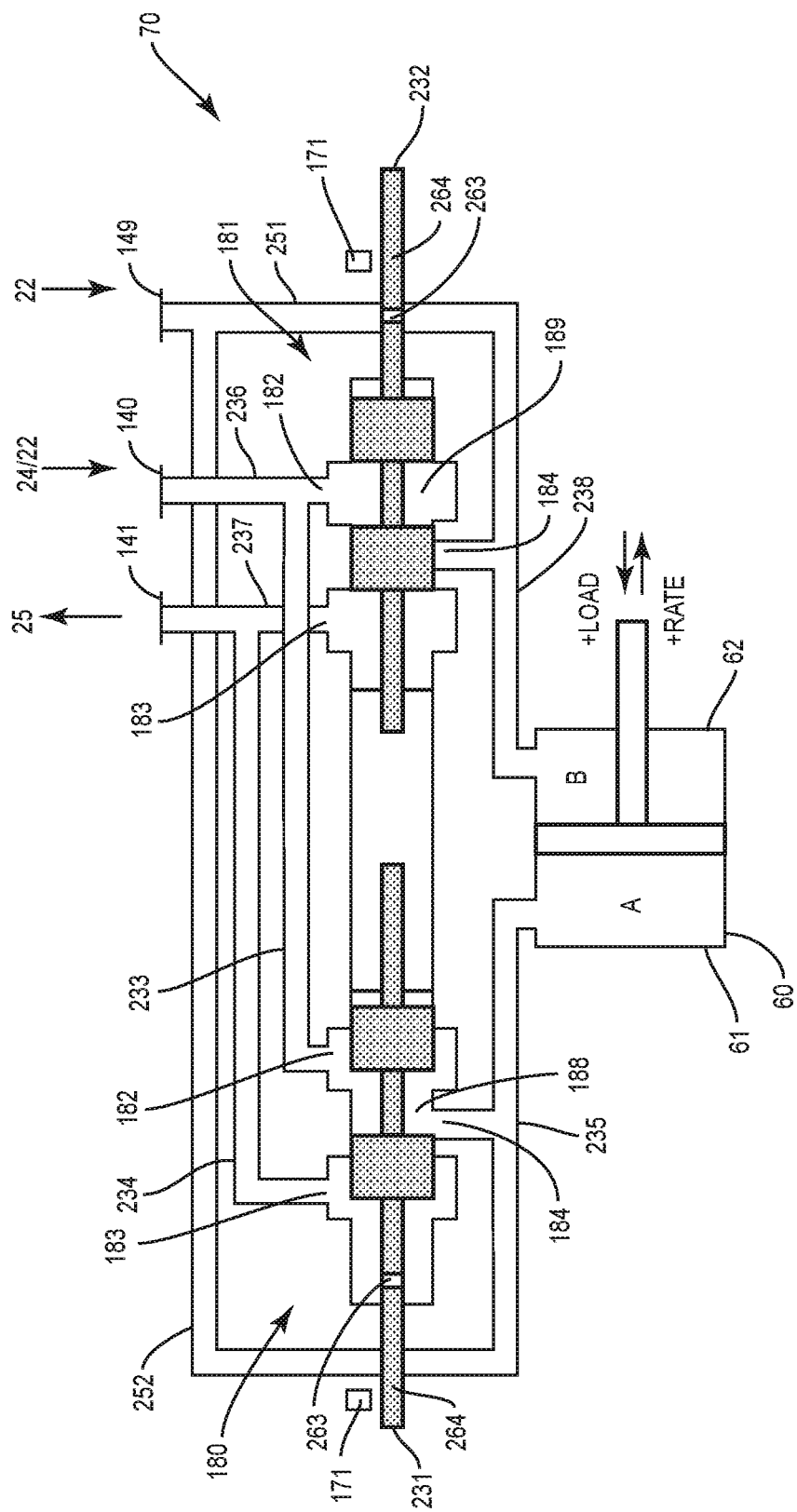
FIG. 32 is a schematic view of a dual spool valve operating in a first quadrant.

FIG. 32 illustrates control with the control device 60 operating in the first quadrant Q1. This includes a positive load and a positive rate. In this example, the second valve section 181 has failed and the solenoid 171 is de-energized and the second spool 232 is in the third position with the orifice 263 aligned with the line 251. Control in the first quadrant Q1 occurs through hydraulic fluid moving into the first chamber 61. The pressure in the first chamber 61 is greater than the pressure in the second chamber 62. The first spool 231 is in the second position which supplies hydraulic fluid from the first port 140 through lines 233-235 through port 182 of the first manifold 188. Fluid is able to flow out of the second chamber 62 due to the alignment of the orifice 263 with the line 251.

Figure 33:
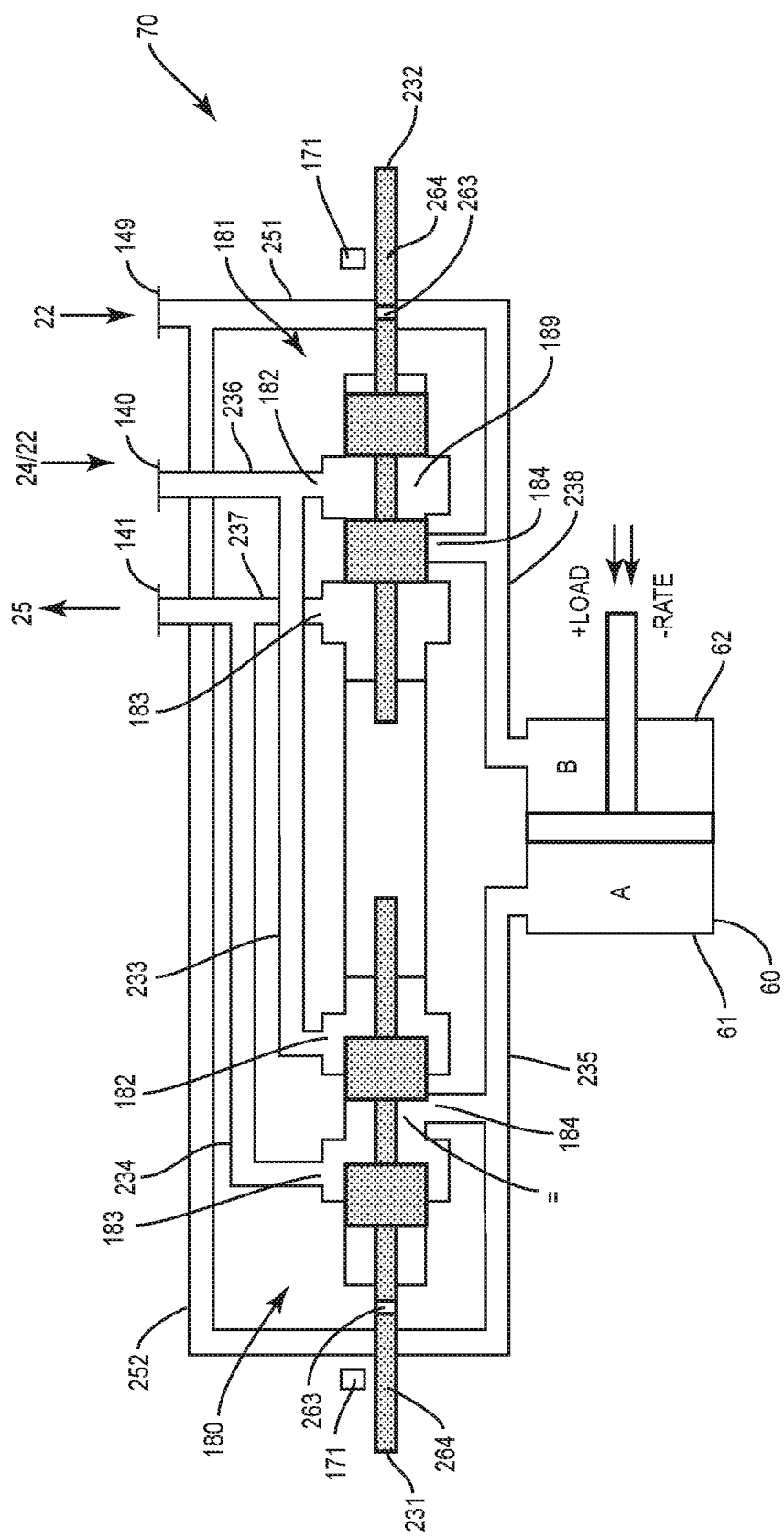
FIG. 33 is a schematic view of a dual spool valve operating in a second quadrant.

FIG. 33 illustrates control with the control device 60 operating in the second quadrant Q2. This includes a positive load and a negative rate. The second valve section 181 has failed and the solenoid 171 is de-energized and the second spool 232 is in the third position with the orifice 263 aligned with the line 251. Control in the second quadrant Q2 occurs through hydraulic fluid moving out of the first chamber 61. The pressure in the second chamber 62 is greater than the pressure in the first chamber 61. The first spool 231 is in the first position which opens port 183 and allows hydraulic fluid to move out of the first chamber 61 through lines 235-234 to port 141. Hydraulic fluid is supplied to the second chamber 62 through line 251 due to the alignment of the orifice 263 with the line 251.

Figure 34:
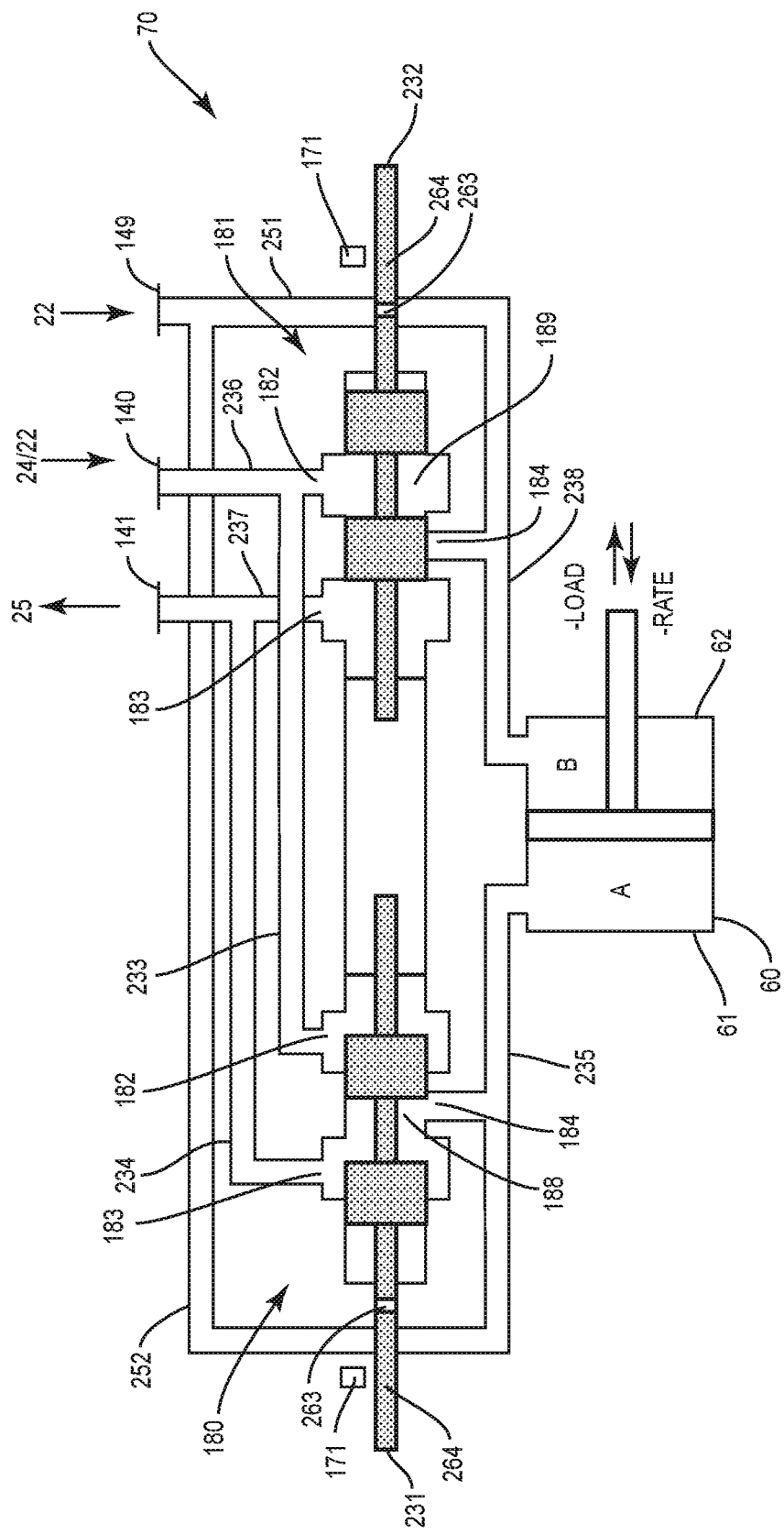
FIG. 34 is a schematic view of a dual spool valve operating in a third quadrant.

FIG. 34 illustrates control with the control device 60 operating in the third quadrant Q3. This includes a negative load and a negative rate. The second valve section 181 has failed and the solenoid 171 is de-energized and the second spool 232 is in the third position with the orifice 263 aligned with the line 251. Control in the third quadrant Q3 occurs through hydraulic fluid moving out of the first chamber 61. The pressure in the second chamber 62 is greater than the pressure in the first chamber 61. The first spool 231 is in the first position which opens port 183 and allows hydraulic fluid to move out of the first chamber 61 through lines 235-234 to port 141. Hydraulic fluid is supplied to the second chamber 62 through line 251 due to the alignment of the orifice 263 with the line 251.

Figure 35:
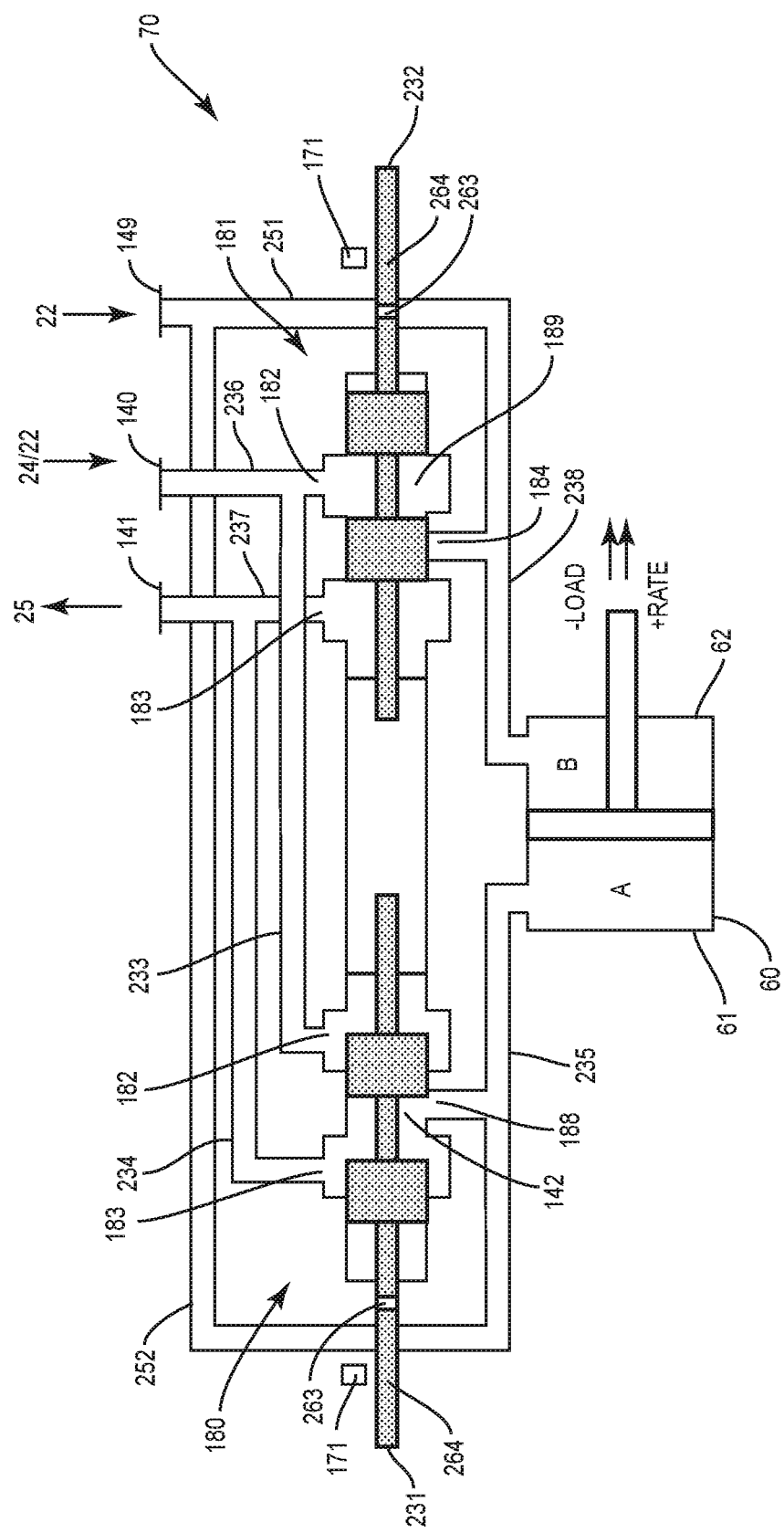
FIG. 35 is a schematic view of a dual spool valve in a fourth quadrant.

FIG. 35 illustrates control with the control device 60 operating in the fourth quadrant Q4. This includes a negative load and a positive rate. The second valve section 181 has failed and the solenoid 171 is de-energized and the second spool 232 is in the third position with the orifice 263 aligned with the line 251. Control in the fourth quadrant Q4 is controlled through the hydraulic fluid moving out of the second chamber 62 that moves through the orifice 263 of the second spool 232. The size and/or alignment of the orifice 263 controls the amount of hydraulic fluid that can pass from the second chamber 62 along lines 238-251. This control is a result of the pressure in the second chamber 62 being greater than the pressure in the first chamber 61.

Figure 36:
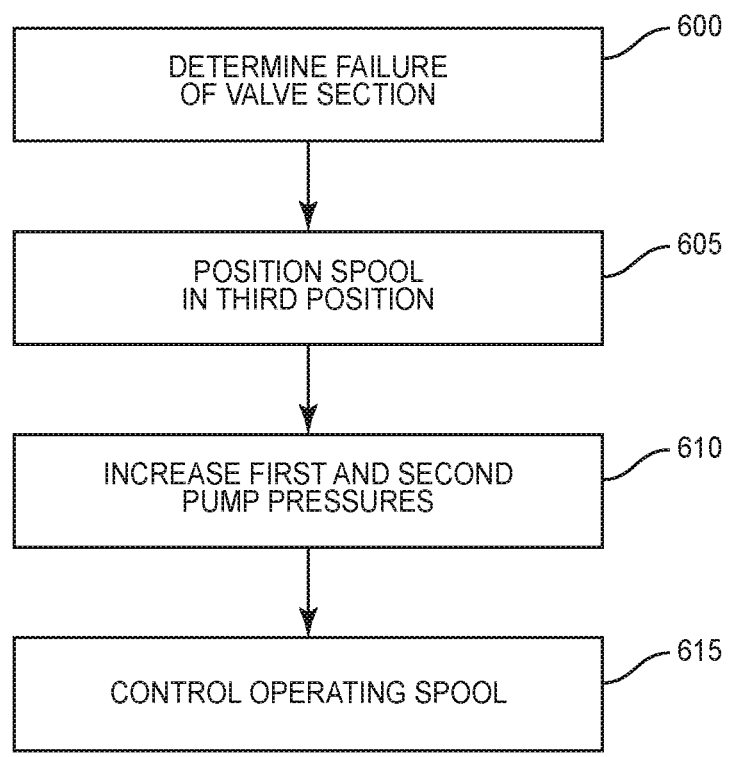
FIG. 36 is a flowchart diagram of a method of operating a control member to move a member.

FIG. 36 illustrates a method of operating the valve 70 during a failure occurrence. The actuation control unit 90 determines a failure of one of the valve sections 180, 181. This can include: determining an unexpected difference along a supply line 22, 24 and one or both of the first and second chambers 61, 62; determining that one of the spools 231, 232 is not moving between the commanded positions; and other fault situations with the valve 70 (block 600). The failed spool 231, 232 is moved to the third position (block 605). This can include de-energizing the solenoid 71 that controls the spool 231, 232 and causing it to move to the third position. The actuation control unit 90 can also increase the pressure of the hydraulic fluid supplied to the valve 70 (block 610). This can include increasing the system pressure supplied through the first pump 21 and the boost pressure supplied through the second pump 23. The actuation control unit 90 operates the functioning spool 231 or 232 to operate according to the quadrant requirements explained above.

The hydraulic system 20 can supply hydraulic fluid to more than one control device 60. The multiple control devices 60 can be connected to one or more members 11. In one design, the hydraulic system 20 supplies fluid to multiple control devices 60.

Boost control when a hydraulic system 20 supports multiple control devices 60 provides for determining an error for each of the control devices 60. The largest error amongst the control devices 60 is then used to control the system pressure. This ensures that the hydraulic system 20 is able to adequately support each of the control devices 60. For each control device 60, the error in the first quadrant Q1 is $e=(A+\delta P)-P$. In the third quadrant Q3, the error $e=(B+\delta P)-P$. For the second and fourth quadrants Q2, Q4, the error is equal to zero.

The control device 60 with the integrated hydraulic actuator and inerter provides benefits that conventional actuator systems do not provide, or are not capable of providing. For example, the control device 60 of the present aspects creates or contributes to a system that beneficially allows for significant savings in the power consumption by reducing the number of high pressure cycles of the control device 60 by increasing the damping of the actuator that permits reduced actuator piston area and reduced flow proportional to the area reduction. Such reductions allow the hydraulic system 20 to provide hydraulic fluid at reduced flow rate. Additionally, because the control device 60 of the present disclosure controls flutter, fewer control devices 60 are needed thereby requiring less power to be generated for the pumps 21, 23.

The hydraulic system 10 can be used to move a variety of different members 11. These include but are not limited to a movable member 11 on various types of vehicles, such as aircraft, cars, trucks, and motorcycles. This can also include members 11 on a human exoskeleton.

Figure 37:
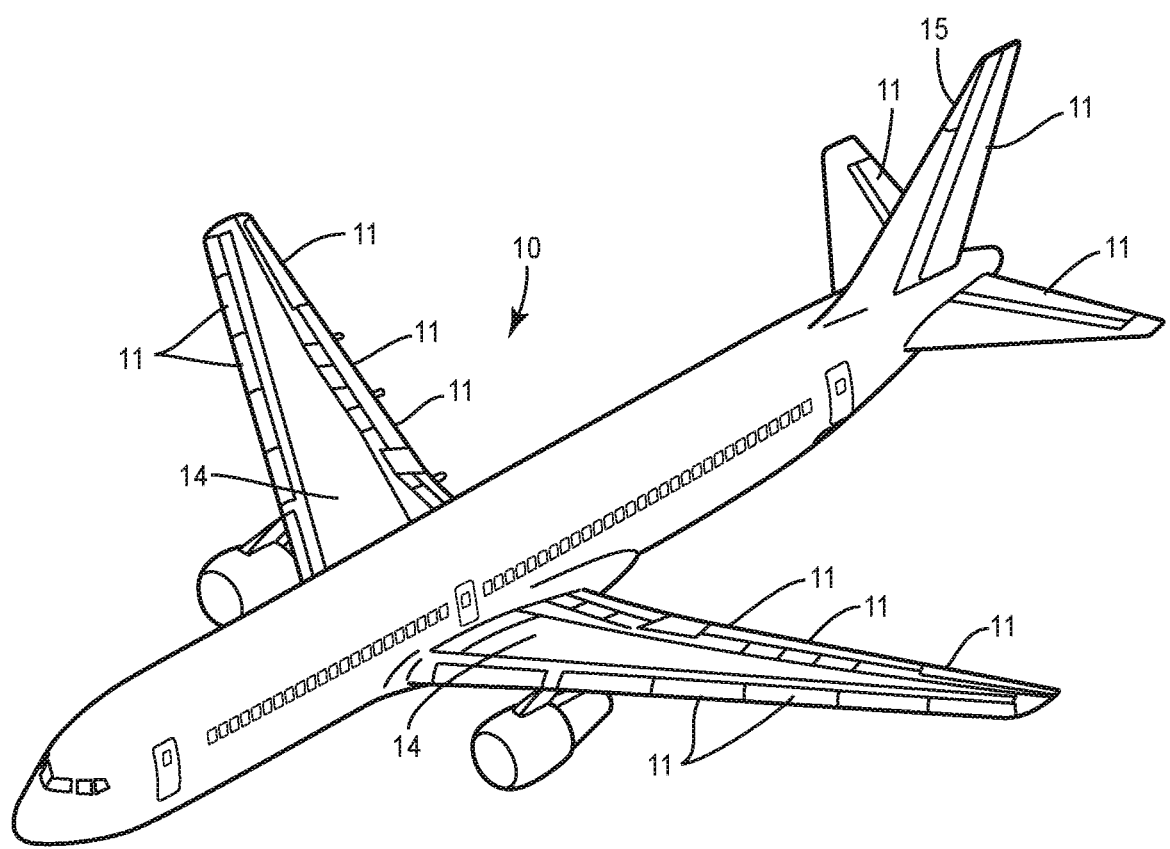
FIG. 37 is a perspective view of movable members that are part of an aircraft.

FIG. 37 includes a specific application for control of one or more flight control members 11. As illustrated in FIG. 37, flight control members 11 can be positioned at various locations on the aircraft includes the wings 14 and tail 15 and include but are not limited to a rudder, elevators, ailerons, wing leading and trailing edge devices, and spoilers. The flight control members 11 are movably attached to the aircraft to change their orientation to control the flight. The hydraulic system 20 and methods controlling a position of a flight control member 11 can be used with a variety of aircraft. One aircraft includes a commercial aircraft that includes rows of seats each configured to accommodate a passenger. Other aircraft include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

Figure 38:
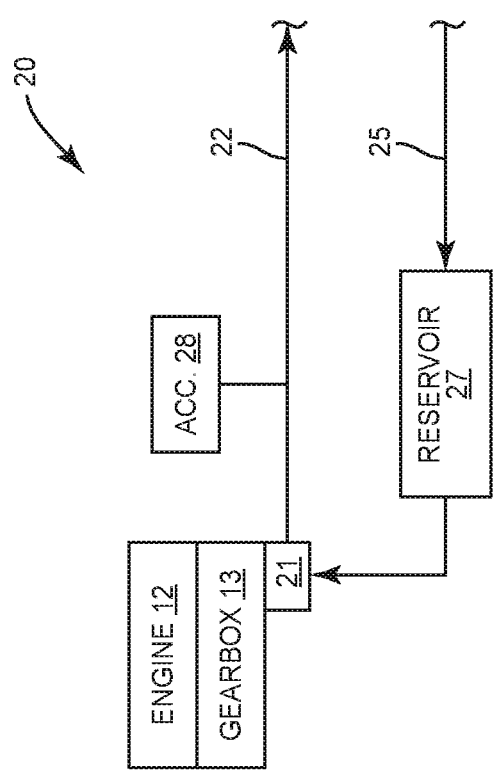
FIG. 38 is a schematic view an engine of an aircraft powers a pump through a gearbox.

Within an aircraft context, one or more of the pumps 21, 23 can be powered through engines 12 of the aircraft. As illustrated in FIG. 38, mechanical power generated by the engine 12 is converted into hydraulic or electrical power for distribution about the aircraft. A gearbox 13 can integrate or couple the engine 12 to the first pump 21. The gearbox 13 can also integrate or couple the engine 12 to an electric generator and/or environmental control system (not illustrated). The first pump 21 converts mechanical power provided by the engine 12 into hydraulic power for distribution about the hydraulic system 20.

The aircraft can include multiple hydraulic systems 20 to control the movement of the various flight control members 11. This can include a first hydraulic system 20 that extends along a first portion of the aircraft (e.g., starboard side). The first hydraulic system 20 includes a first pump 21 that is driven by a first engine (e.g., a starboard engine). A second hydraulic system 20 can be positioned on a second portion of the aircraft and include a separate first pump 21 that is driven by a different engine. The number of hydraulic systems 20 in an aircraft can vary. Further, the engines 12 can drive different numbers of first pumps 21. For example, an aircraft can include four main engines, namely two left main engines and two main right engines. Each main engine can drive two first pumps 21. Additionally, the aircraft can include two hydraulic systems 20, where four first pumps 21 associated with the left main engines 12 produce hydraulic power to a left hydraulic system 20 and four first pumps 21 associated with the right main engines 12 produce hydraulic power to a right hydraulic system 20.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to control a member, the system comprising:
   a control device comprising a hydraulic actuator and integrated inerter that is operatively coupled to the member;
   a first pump that delivers hydraulic fluid at a first pressure to the control device;
   a second pump that delivers hydraulic fluid to the control device at a second pressure that is higher than the first pressure;
   a dual spool valve that is positioned between the control device and the first and second pumps, the dual spool valve directs the hydraulic fluid to the control device; and
   a return line that extends between the control device and the first pump to deliver the hydraulic fluid from the control device to one of the first pump and the second pump.

2. The system of claim 1, wherein the return line further comprises a spare line that extends between the return line and the second pump to deliver the hydraulic fluid that is returning towards the first pump to the second pump prior to reaching the first pump.

3. The system of claim 2, further comprising a valve positioned upstream from the second pump and movable between a first valve position in which the hydraulic fluid is delivered to the second pump from the first pump and not the spare line and a second valve position in which the hydraulic fluid is delivered to the second pump from the spare line.

4. The system of claim 1, wherein the inerter comprises:
   a first terminal and a second terminal movable relative to one another along an axis to be coupled to a support structure and the member;
   a housing;
   a piston axially slidable within the housing;
   a rod coupled to the piston and movable with the first terminal;
   a threaded shaft coupled to and movable with the second terminal;
   a flywheel having a flywheel annulus coupled to at least one of the rod and the threaded shaft, the flywheel configured to rotate in proportion to axial acceleration of the rod relative to the threaded shaft in correspondence with actuation of the member by the control device.

5. The system of claim 4, wherein the piston divides an interior of the housing between a first chamber and a second chamber, and the dual spool valve directs the hydraulic fluid into and out of the first chamber and the second chamber.

6. The system of claim 1, wherein the dual spool valve comprises:
   a first port to receive hydraulic fluid from one of the first and second pumps;
   a second port to discharge hydraulic fluid to the return line;
   first and second valve sections each comprising a manifold, a first line fluidly connected to the first port, a second line fluidly connected to the second port, and a third line fluidly connected to the control device and with the manifold of the first valve section being spaced away from the manifold of the second valve section; and
   a first spool positioned in the first manifold and a second spool positioned in the second manifold, each of the first and second spools movable to prevent a flow of hydraulic fluid when aligned with one of the first and second lines;
   each of the first and second spools independently positionable within the respective first and second manifolds between a first position aligned with just one of the first and second lines, and a second position aligned with just the other of the first and second lines, and with the first and second spools spaced away from the third lines in each of the first and second positions to allow hydraulic fluid to flow into and out of the control device.

7. The system of claim 6, wherein each of the first and second spools comprises a first block and a second block that are spaced apart along a shaft and with the first blocks aligned with one of the first and second lines in the first position and with the second blocks aligned with the other of the first and second lines in the second position and with both the first and second blocks positioned away from the third lines in each of the first and second positions.

8. The system of claim 6, wherein each of the first and second valve sections is a 3-way valve.

9. The system of claim 1, wherein the dual spool valve comprises:
   a first port to receive hydraulic fluid from the second pump;
   a second port to discharge hydraulic fluid to the return line;
   a third port to receive hydraulic fluid from the first pump;
   a first valve section comprising:
     a first manifold with a supply port, a return port, and an actuator port;
     a first closure line that extends between the third port and the control device; and
     a first spool movable within the first manifold between a first position to allow hydraulic fluid to flow through the first valve section to and from the control device through just the supply port, a second position to allow hydraulic fluid to flow through the first valve section to and from the control device through just the return port, and a third position to allow hydraulic fluid to flow through the first valve section to and from the control device through just the first closure line;
   a second valve section comprising:
     a second manifold with a supply port, a return port, and an actuator port;
     a second closure line that extends between the third port and the control device; and
     a second spool movable within the second manifold between a first position to allow hydraulic fluid to flow through the second valve section to and from the control device through just the supply port, a second position to allow hydraulic fluid to flow through the second valve section to and from the control device through just the return port, and a third position to allow hydraulic fluid to flow through the second valve section to and from the control device through just the second closure line.

10. The system of claim 9, wherein the first spool comprises a shaft with first and second blocks spaced apart along the shaft, the shaft extending across the first closure line in each of the first and second positions.

11. The system of claim 10, wherein the shaft comprises an orifice that aligns with the first closure line in the third position to allow hydraulic fluid to flow along the first closure line and through the orifice to and from the control device.

12. A system to move a member, the system comprising:
a first pump that delivers hydraulic fluid at a first pressure;
a second pump that delivers hydraulic fluid at a second pressure;
a control device comprising an integrated hydraulic actuator and an inerter, the actuator comprising a first chamber and a second chamber, the control device operatively coupled to the member;
a dual spool valve positioned between the first and second pumps and the control device to direct the hydraulic fluid to and from the first and second chambers;
supply lines that deliver the hydraulic fluid from the first and second pumps to the dual spool valve; and
return lines that deliver the hydraulic fluid from the dual spool valve to the first pump and the second pump.

13. The system of claim 12, wherein the return lines further comprise a spare line that extends between the return line and the second pump to deliver the hydraulic fluid that is returning towards the first pump to the second pump prior to reaching the first pump.

14. The system of claim 13, further comprising a valve positioned upstream from the second pump and movable between a first valve position in which the hydraulic fluid is delivered to the second pump from the first pump and a second valve position in which the hydraulic fluid is delivered to the second pump from the spare line.

15. The system of claim 12, wherein the inerter comprises:
a first terminal and a second terminal movable relative to one another along an axis to be coupled to a support structure and the member;
a housing;
a piston axially slidable within the housing;
a rod coupled to piston and movable with the first terminal;
a threaded shaft coupled to and movable with the second terminal;
a flywheel having a flywheel annulus coupled to at least one of the rod and the threaded shaft, the flywheel configured to rotate in proportion to axial acceleration of the rod relative to the threaded shaft in correspondence with actuation of the member by the control device.

16. The system of claim 15, wherein the piston divides an interior of the housing between a first chamber and a second chamber, and the dual spool valve directs the hydraulic fluid into and out of the first chamber and the second chamber.

17. The system of claim 12, wherein the dual spool valve comprises:
a first port to receive hydraulic fluid from one of the first and second pumps;
a second port to discharge hydraulic fluid to the return lines;
first and second valve sections each comprising a manifold, a first line fluidly connected to the first port, a second line fluidly connected to the second port, and a third line fluidly connected to the control device and with the manifold of the first valve section being spaced away from the manifold of the second valve section;
a first spool positioned in the first manifold and a second spool positioned in the second manifold, each of the first and second spools movable to prevent a flow of hydraulic fluid when aligned with one of the first and second lines;
each of the first and second spools independently positionable within the respective first and second manifolds between a first position aligned with just one of the first and second lines, and a second position aligned with just the other of the first and second lines, and with the first and second spools spaced away from the third lines in each of the first and second positions to allow hydraulic fluid to flow into and out of the control device.

18. The system of claim 17, wherein each of the first and second valve sections is a 3-way valve.

19. The system of claim 12, wherein the dual spool valve comprises:
a first port to receive hydraulic fluid from the second pump;
a second port to discharge hydraulic fluid to the return lines;
a third port to receive hydraulic fluid from the first pump;
a first valve section comprising:
a first manifold with a supply port, a return port, and an actuator port;
a first closure line that extends between the third port and the control device; and
a first spool movable within the first manifold between a first position to allow hydraulic fluid to flow through the first valve section to and from the control device through just the supply port, a second position to allow hydraulic fluid to flow through the first valve section to and from the control device through just the return port, and a third position to allow hydraulic fluid to flow through the first valve section to and from the control device through just the first closure line;
a second valve section comprising:
a second manifold with a supply port, a return port, and an actuator port;
a second closure line that extends between the third port and the control device; and
a second spool movable within the second manifold between a first position to allow hydraulic fluid to flow through the second valve section to and from the control device through just the supply port, a second position to allow hydraulic fluid to flow through the second valve section to and from the control device through just the return port, and a third position to allow hydraulic fluid to flow through the second valve section to and from the control device through just the second closure line.

20. A system to control a member, the system comprising:
a first pump that delivers hydraulic fluid at a first pressure;
a control device comprising a hydraulic actuator and integrated inerter that is operatively coupled to the member;
a supply line through which the hydraulic fluid is delivered from the first pump to the control device;
a second pump that delivers the hydraulic fluid to the control device at a second pressure that is higher than the first pressure;

a dual spool valve that is positioned between the control device and the first and second pumps, the dual spool valve directs the hydraulic fluid;

a return line that returns the hydraulic fluid from the control device to the first pump; and a spare line that extends between the return line and the second pump, the spare line positioned along the return line upstream from the first pump;

wherein at least a portion of the hydraulic fluid that is supplied to the second pump comprises the hydraulic fluid that is returning along the return line from the control device towards the first pump.

21. The system of claim 20, further comprising a second line that extends between the second pump and the dual spool valve to deliver the hydraulic fluid from the second pump to the control device, the second line being different than the supply line.

22. The system of claim 20, further comprising a valve positioned upstream of the second pump and configured between a first valve position in which hydraulic fluid is delivered to the second pump from just the first pump and a second valve position in which the hydraulic fluid is delivered to the second pump from the spare line.

23. A method of operating a system to control a member, the method comprising:

positioning a dual spool valve at a first position and supplying hydraulic fluid at a first pressure from a first pump to a control device that is operatively connected to the member, the control device comprising an integrated actuator and inerter;

returning the hydraulic fluid from the control device to the first pump along a return line;

in response to a load pressure demand, positioning the dual spool valve at a second position and supplying hydraulic fluid to the control device from a second pump at an elevated pressure that is above the first pressure; and in response to the load pressure demand, supplying the hydraulic fluid to the second pump from the return line prior to the hydraulic fluid being returned to the first pump.

24. The method of claim 23, further comprising supplying hydraulic fluid at a first pressure to both a first chamber and a second chamber of the control device.

25. The method of claim 24, further comprising moving hydraulic fluid between the first and second chambers without the hydraulic fluid exiting from the control device.

26. The method of claim 23, further comprising in response to the load pressure demand, supplying hydraulic fluid to the second pump from an accumulator positioned upstream from the second pump.

27. The method of claim 23, further comprising in response to the load pressure demand, continuing to supply hydraulic fluid to the second pump from the first pump.

28. The method of claim 23, further comprising supplying the second pump with hydraulic fluid that is supplied from just the first pump when the load pressure demand is below a predetermined amount and supplying the second pump with hydraulic fluid from just each of an accumulator and the return line in response to determining the load pressure demand is above the predetermined amount.

29. A method of controlling a control device to move a member, the method comprising:

positioning a first spool in a first manifold at a second position and opening a supply port in the first manifold and moving hydraulic fluid from a supply line and into a first chamber of a hydraulic actuator and positioning a second spool in a second manifold at a first position and opening a return port in the second manifold and moving hydraulic fluid from a second chamber of the hydraulic actuator to a return line and moving a piston of the hydraulic actuator in a first direction;

positioning the first spool in the first manifold at a first position and opening a return port in the first manifold and positioning the second spool in the second manifold at the first position and opening the return port in the second manifold and moving hydraulic fluid from the first chamber of the hydraulic actuator through the return port in the first manifold and through the return port in the second manifold and into the second chamber of the hydraulic actuator and moving the piston of the hydraulic actuator in a second direction;

positioning the first spool in the first manifold at the first position and opening the return port in the first manifold and moving hydraulic fluid from the first chamber to the return line and positioning the second spool in the second manifold to a second position and opening a supply port in the second manifold and moving hydraulic fluid from the supply line and into the second chamber of the hydraulic actuator and moving the piston of the hydraulic actuator in the second direction; and positioning the first spool in the first manifold at the first position and opening the return port in the first manifold and positioning the second spool in the second manifold to the first position and opening the return port in the second manifold and moving hydraulic fluid from the second chamber of the hydraulic actuator through the return port in the second manifold and through the return port in the first manifold and into the first chamber of the hydraulic actuator and moving the piston of the hydraulic actuator in the first direction;

while moving hydraulic fluid to the first and second chambers, axially accelerating using an inerter coupled to the control device at a first terminal relative to a second terminal simultaneously with and in proportion to actuation of the control device; and rotationally accelerating a flywheel in the control device in proportion to and simultaneous with the axial acceleration of the first terminal relative to the second terminal.

30. The method of claim 29, further comprising moving hydraulic fluid through the first manifold when moving hydraulic fluid into and from the first chamber of the hydraulic actuator and moving hydraulic fluid through the second manifold when moving hydraulic fluid into and from the second chamber.

31. The method of claim 29, further comprising positioning the first spool in the first manifold at the second position and blocking hydraulic fluid from moving through the return port of the first manifold.

32. The method of claim 29, further comprising positioning the second spool in the second manifold at the first position and blocking hydraulic fluid from moving into the second chamber through the supply port of the second manifold.

33. The method of claim 29, further comprising moving the first spool independently from the second spool.

* * * * *